United States Patent
Li et al.

(10) Patent No.: US 11,902,940 B2
(45) Date of Patent: *Feb. 13, 2024

(54) METHOD AND APPARATUS FOR HANDLING DEVICE-TO-DEVICE FEEDBACK TRANSMISSION IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW); Yi-Hsuan Kung, Taipei (TW); Li-Chih Tseng, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,241

(22) Filed: Mar. 16, 2022

(65) Prior Publication Data

US 2022/0217680 A1 Jul. 7, 2022

Related U.S. Application Data

(63) Continuation of application No. 17/076,604, filed on Oct. 21, 2020, now Pat. No. 11,317,381.
(Continued)

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 28/0278* (2013.01);
(Continued)

(58) Field of Classification Search
CPC . H04W 72/02; H04W 72/23; H04W 28/0278; H04W 28/06; H04W 72/1263; H04W 80/02

See application file for complete search history.

(56) References Cited

U.S. PATENT DOCUMENTS 9,301,316 B2 3/2016 Moulsley et al.
10,251,191 B2 4/2019 Lee et al.
(Continued)

FOREIGN PATENT DOCUMENTS

EP 3148283 A1 3/2017
EP 3512276 A1 7/2019
(Continued)

OTHER PUBLICATIONS

Corresponding European Patent Application No. 20202948.4, Extended European Search Report dated Mar. 26, 2021.
(Continued)

*Primary Examiner* — Rhonda L Murphy
(74) *Attorney, Agent, or Firm* — Cooper Legal Group LLC

(57) ABSTRACT

Methods and apparatuses for handling device-to-device feedback transmission in a wireless communication system are disclosed herein. In one method, a first device receives a configuration for operating in a network scheduling mode for acquiring sidelink resources. The first device receives a sidelink control information with a report request from a second device. The first device triggers or is triggered to transmit a report to the second device in response to the report request. If the first device has no available sidelink resource for transmitting the report, the first device triggers a scheduling request. The first device transmits a signaling of the scheduling request to the network. The first device receives a sidelink grant from the network. The first device utilizes sidelink resource(s) indicated by the sidelink grant to transmit the report to the second device.

20 Claims, 13 Drawing Sheets

Related U.S. Application Data

(60) Provisional application No. 62/928,731, filed on Oct. 31, 2019.

(51) Int. Cl.

| | | |
|---|---|---|
| *H04W 28/02* | (2009.01) | |
| *H04W 28/06* | (2009.01) | |
| *H04W 72/1263* | (2023.01) | |
| *H04W 80/02* | (2009.01) | |
| *H04W 72/23* | (2023.01) | |
| *H04W 92/18* | (2009.01) | |

(52) U.S. Cl.
CPC ....... *H04W 28/06* (2013.01); *H04W 72/1263* (2013.01); *H04W 72/23* (2023.01); *H04W 80/02* (2013.01); *H04W 92/18* (2013.01)

(56) References Cited

U.S. PATENT DOCUMENTS

| | | |
|---|---|---|
| 10,482,038 B2 | 11/2019 | Agiwal et al. |
| 10,869,329 B2 | 12/2020 | Xu et al. |
| 11,044,066 B2 | 6/2021 | Lee et al. |
| 2017/0353819 A1 | 12/2017 | Yin et al. |
| 2018/0139724 A1 | 5/2018 | Loehr et al. |
| 2018/0279275 A1 | 9/2018 | Chen et al. |
| 2018/0324842 A1 | 11/2018 | Gulati et al. |
| 2019/0239112 A1 | 9/2019 | Rao et al. |
| 2020/0022089 A1 | 1/2020 | Guo |
| 2020/0145867 A1 | 5/2020 | Tseng et al. |
| 2020/0235965 A1 | 7/2020 | Stern-Berkowitz et al. |
| 2020/0275412 A1 | 8/2020 | Kim |
| 2020/0351704 A1 | 11/2020 | Yu et al. |
| 2020/0359375 A1* | 11/2020 | Hwang ................. H04L 1/1854 |
| 2021/0083820 A1 | 3/2021 | Gulati et al. |

FOREIGN PATENT DOCUMENTS

| | | |
|---|---|---|
| WO | 2016072590 A1 | 5/2016 |
| WO | 2018084524 A1 | 5/2018 |

OTHER PUBLICATIONS

LG Electronics, "Feature lead summary #2 for AI 7.2.4.5 Physical layer procedures for sidelink", 3GPP TSG RAN WG1 #98bis R1-1911702, pp. 1-37, Agenda Item 7.2.4.5, Oct. 14-20, 2019, Chongqing, China.

Spreadtrum Communications, "Discussion on physical layer procedures for sidelink", 3GPP TSG RAN WG1 #98bis R1-1910009, pp. 1-6, Agenda Item 7.2.4.5, Oct. 14-20, 2019, Chongqing, China.

3GPP TS 36.523-1 V16.2.0, pp. 1-48, Release 16, Sep. 2019.

3GPP TS 36.331 V.15.7.0, Evolved Universal Terrestrial Radio Access (E-UTRA), Radio Resource Control (RRC), Protocol Specification, Sep. 2019, pp. 1-21, Release 15.

Ericsson, "Feature lead summary #4 on Resource allocation for NR sidelink Mode 1", 3GPP TSG RAN WG1 Meeting #97 R1-1907916 (revision of R1-1907854), pp. 1-29, Agenda Item 7.2.4.2.1, May 13-17, 2019, Reno, USA.

Samsung, "On physical layer procedures for NR V2X", 3GPP TSG RAN WG1 #98 R1-1908481, pp. 1-19, Agenda Item 7.2.4.5, Aug. 26-30, 2019, Prague, CZ.

Corresponding Korean Patent Application No. 2020-0136808, Office Action dated Nov. 8, 2022, 8 pages—English translation.

Vivo: "Physical Layer Procedure for NR Sidelink", 3GPP TSG RAN WG1 Meeting #98bis, R1-1910217, Chongqing, China, Oct. 14-20, 2019, 24 pages.

Corresponding Chinese Patent Application No. 2020-11131494.9, Office Action dated Sep. 27, 2023, 18 pages—English translation.

\* cited by examiner

| DCI format | Search Space |
|---|---|
| DCI format 5A | For PDCCH: Common and UE specific by C-RNTI<br>For EPDCCH: UE specific by C-RNTI |

FIG. 5

(PRIOR ART)

| SL index field in DCI format 5A | Indicated value $m$ |
|---|---|
| '00' | 0 |
| '01' | 1 |
| '10' | 2 |
| '11' | 3 |

FIG. 6

(PRIOR ART)

| Resource reservation field in SCI format 1 | Indicated value X | Condition |
|---|---|---|
| '0001', '0010', ..., '1010' | Decimal equivalent of the field | The higher layer decides to keep the resource for the transmission of the next transport block and the value $X$ meets $1 \leq X \leq 10$. |
| '1011' | 0.5 | The higher layer decides to keep the resource for the transmission of the next transport block and the value $X$ is 0.5. |
| '1100' | 0.2 | The higher layer decides to keep the resource for the transmission of the next transport block and the value $X$ is 0.2. |
| '0000' | 0 | The higher layer decides not to keep the resource for the transmission of the next transport block. |
| '1101', '1110', '1111' | Reserved | |

FIG. 7

(PRIOR ART)

| Definition | Sidelink RSSI (S-RSSI) is defined as the linear average of the total received power (in [W]) per SC-FDMA symbol observed by the UE only in the configured sub-channel in SC-FDMA symbols 1, 2, ..., 6 of the first slot and SC-FDMA symbols 0,1,..., 5 of the second slot of a subframe<br><br>The reference point for the S-RSSI shall be the antenna connector of the UE.<br><br>If receiver diversity is in use by the UE, the reported value shall not be lower than the corresponding S-RSSI of any of the individual diversity branches |
|---|---|
| Applicable for | RRC_IDLE intra-frequency,<br>RRC_IDLE inter-frequency,<br>RRC_CONNECTED intra-frequency,<br>RRC_CONNECTED inter-frequency |

FIG. 8

(PRIOR ART)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br><br>The reference point for the PSSCH-RSRP shall be the antenna connector of the UE.<br><br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

FIG. 9

(PRIOR ART)

| R/LCID subheader | CSI trigger MAC control element |

METHOD AND APPARATUS FOR HANDLING DEVICE-TO-DEVICE FEEDBACK TRANSMISSION IN A WIRELESS COMMUNICATION SYSTEM

CROSS-REFERENCE TO RELATED APPLICATIONS

The present application claims priority to and is a continuation of U.S. application Ser. No. 17/076,604, filed on Oct. 21, 2020, entitled "METHOD AND APPARATUS FOR HANDLING DEVICE-TO-DEVICE FEEDBACK TRANSMISSION IN A WIRELESS COMMUNICATION SYSTEM", the entire disclosure of which is incorporated herein in its entirety by reference. U.S. application Ser. No. 17/076,604 claims the benefit of U.S. Provisional Patent Application Ser. No. 62/928,731 filed on Oct. 31, 2019, the entire disclosure of which is incorporated herein in its entirety by reference.

FIELD

This disclosure generally relates to wireless communication networks, and more particularly, to a method and apparatus for handling device-to-device feedback transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for handling device-to-device feedback transmission in a wireless communication system are disclosed herein. In one method, a first device receives a configuration for operating in a network scheduling mode for acquiring sidelink resources. The first device receives a sidelink control information with a report request from a second device. The first device triggers or is triggered to transmit a report to the second device in response to the report request. If the first device has no available sidelink resource for delivering the report, the first device triggers a scheduling request. The first device transmits a signaling of the scheduling request to the network. The first device receives a sidelink grant from the network. The first device utilizes sidelink resource(s) indicated by the sidelink grant to transmit the report to the second device.

In another method, a first device receives a configuration for operating in a network scheduling mode for acquiring sidelink resources. The first device receives a sidelink control information with a report request from a second device. The first device triggers or is triggered to transmit a report to the second device in response to the report request, wherein a duration time is configured for canceling or discarding not yet transmitted or assembled report. The first device triggers a scheduling request if the first device has no available sidelink resource for delivering the report. The first device cancels or discards the report if the first device has not yet transmitted or assembled the report within the duration time.

In yet another method, a first device receives a sidelink control information with a report request from a second device. The first device triggers or is triggered to transmit a report to the second device in response to the report request, wherein a duration time is configured for canceling or discarding not yet transmitted or not yet assembled report. The first device cancels or discards the report if the first device has not yet transmitted or assembled the report within the duration time.

BRIEF DESCRIPTION OF THE DRAWINGS

FIG. 5 is a reproduction of Table 14.2-2 entitled PDCCH/EPDCCH configured by SL-V-RNTI or SL-SPS-V-RNTI taken from 3GPP TS 36.213 V15.4.0 (2018-12).

FIG. 6 is a reproduction of Table 14.2.1-1 entitled Mapping of DCI format 5A offset field to indicated value m taken from 3GPP TS 36.213 V15.4.0 (2018-12).

FIG. 7 is a reproduction of Table 14.2.1-2 entitled Determination of the Resource reservation field in SCI format 1 taken from 3GPP TS 36.213 V15.4.0 (2018-12).

FIG. 8 is a reproduction of table taken from 3GPP TS 36.214 V15.3.0 (2018-09).

FIG. 9 is a reproduction of table taken from 3GPP TS 36.214 V15.3.0 (2018-09).

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.4.0 (2018-12), "E-UTRA, Physical layer procedures (Release 15)"; TS 36.214 V15.3.0 (2018-09), "E-UTRA, Physical layer; Measurements (Release 15)"; TS 36.212 V15.4.0 (2018-12), "E-UTRA), Physical layer; Multiplexing and channel coding (Release 15)"; TS 36.211 V15.4.0 (2018-12), "E-UTRA, Physical layer; Physical channels and modulation (Release 15)"; RP-182111, Revised SID: Study on NR V2X; R1-1810051, Final Report of 3GPP TSG RAN WG1 #94 v1.0.0; R1-1812101, Final Report of 3GPP TSG RAN WG1 #94bis v1.0.0; R1-1901482, Final Report of 3GPP TSG RAN WG1 #95 v0.1.0; R1-1901483, Final Report of 3GPP TSG RAN WG1 #AH_1901 v1.0.0; R1-1905837, Final Report of 3GPP TSG RAN WG1 #96 v2.0.0; R1-1905921, Final Report of 3GPP TSG RAN WG1 #96bis v1.0.0; R1-1907973, Final Report of 3GPP TSG RAN WG1 #97 v1.0.0; R1-1909942, Final Report of 3GPP TSG RAN WG1 #98 v1.0.0; Draft Report of 3GPP TSG RAN WG1 #98bis v0.1.0; R1-1910059, "Sidelink physical layer procedures for NR V2X"; R1-1910538, "PHY layer procedures for NR sidelink"; TS 38.321 V15.6.0 (2019-06), "NR; Medium Access Control (MAC) protocol specification"; and TS 36.321 V15.7.0 (2019-09), "E-UTRA; Medium Access Control (MAC) protocol specification". The standards and documents listed above are hereby expressly incorporated by reference in their entirety.

Figure 1:
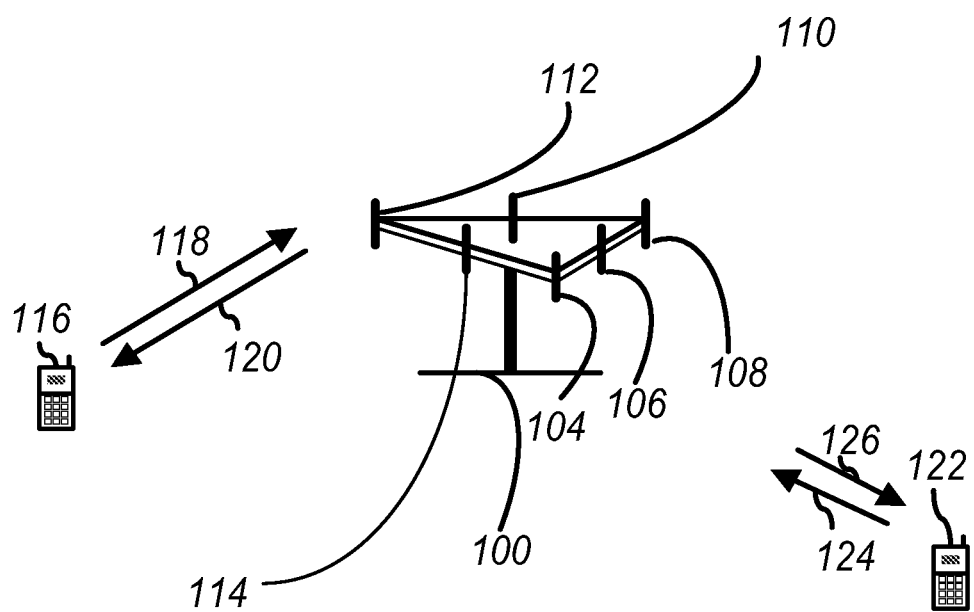
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
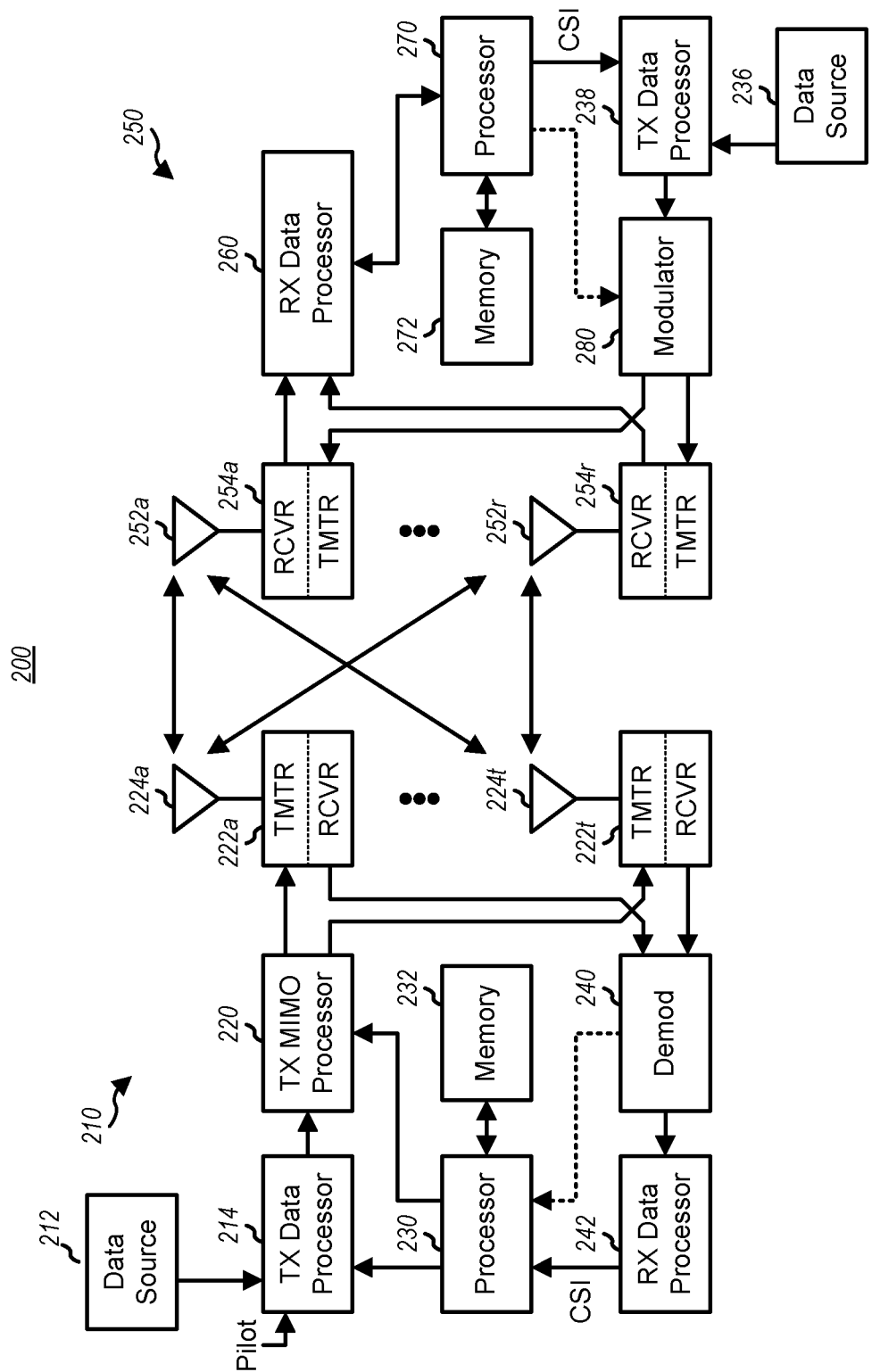
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
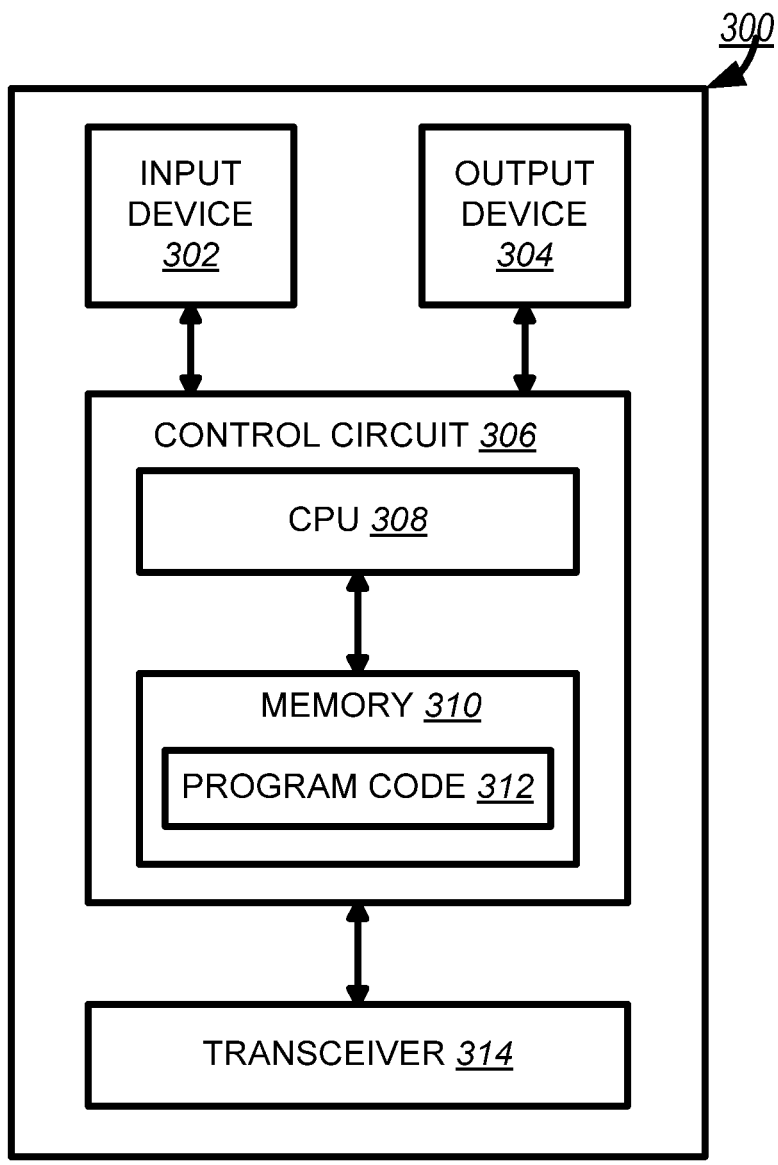
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is Alternatively the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
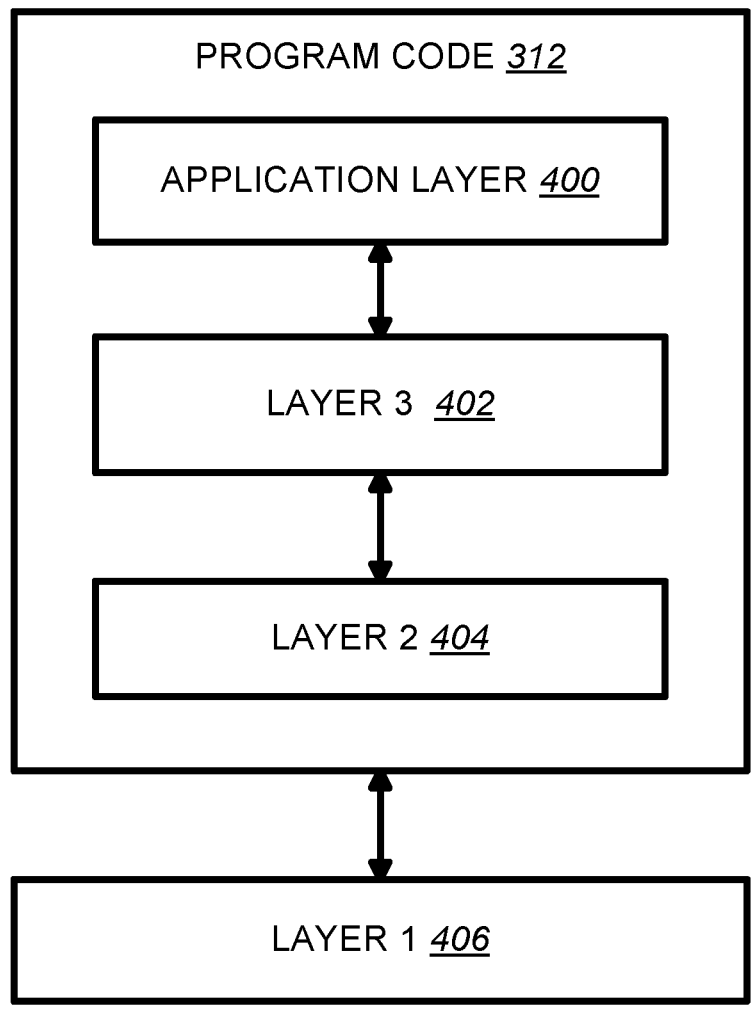
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 V15.4.0 (2018-12), "E-UTRA; Physical layer procedures (Release 15), discloses the UE procedure for Vehicle-to-Everything (V2X) transmission in LTE/LTE-A. The V2X transmissions are performed as sidelink transmission mode 3 or sidelink transmission mode 4 as quoted below:

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1,2,3 or sidelink transmission mode 4. The physical sidelink control channel related procedures are described in Subclause 14.2.

[ . . . ]

14.1 Physical Sidelink Shared Channel Related Procedures 14.1.1 UE Procedure for Transmitting the PSSCH

[ . . . ]

If the UE transmits SCI format 1 on PSCCH according to a PSCCH resource configuration in subframe n, then for the corresponding PSSCH transmissions of one TB for sidelink transmission mode 3, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

[ . . . ]

14.1.1.6 U E Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{reset}$ is determined according to Subclause 14.1.1.4B.

[ . . . ]

14.2 Physical Sidelink Control Channel Related Procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

Table 14.2-2 reproduced as FIG. 5.

The carrier indicator field value in DCI format 5A corresponds to v2x-InterFreqInfo.

14.2.1 UE Procedure for Transmitting the PSCCH

[ . . . ]

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

[ . . . ]

The UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$, where $SF_{gap}$ is the value indicated by "Time gap between initial transmission and retransmission" field in the configured sidelink grant, $L_{ReTX}$ corresponds to the value $n_{subCh}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_c$, among $\{0, 3, 6, 9\}$ in each PSCCH transmission.

Table 14.2.1-1 reproduced as FIG. 6.

Table 14.2.1-1 reproduced as FIG. 7.

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

3GPP TS 36.214 V15.3.0 (2018-09) discloses some measurements for sidelink transmission in LTE/LTE-A as quoted below:

5.1.28 Sidelink Received Signal Strength Indicator (S-RSSI)

Table reproduced as FIG. 8.

5.1.29 PSSCH Reference Signal Received Power (PSSCH-RSRP)

Table reproduced as FIG. 9.

NOTE: The power per resource element is determined from the energy received during the useful part of the symbol, excluding the CP.

3GPP TS 36.212 V15.4.0 (2018-12 discloses the CRC attachment for downlink shared channel and downlink control information in LTE/LTE-A. The downlink shared channel and downlink control information are for communication between network node and UE, i.e., Uu link. The sidelink shared channel and sidelink control information are for communication between UEs, i.e., LTE-V2X (PC5) link or sidelink. The relevant portions of 3GPP TS 36.212[10] are quoted below:

5.3.3 Downlink Control Information

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC.

Figure 5.3.3-1 shows the processing structure for one DCI. The following coding steps can be identified:
- Information element multiplexing
- CRC attachment
- Channel coding
- Rate matching

[ . . . ]

5.3.3.1.9A Format 5A

DCI format 5A is used for the scheduling of PSCCH, and also contains several SCI format 1 fields used for the scheduling of PSSCH.

The following information is transmitted by means of the DCI format 5A:
- Carrier indicator—3 bits. This field is present according to the definitions in [3].
- Lowest index of the subchannel allocation to the initial transmission—$\lceil \log_2(N_{subchannel}^{SL}) \rceil$ bits as defined in subclause 14.1.1.4C of [3].
- SCI format 1 fields according to 5.4.3.1.2:
  - Frequency resource location of initial transmission and retransmission.
  - Time gap between initial transmission and retransmission.
- SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:
- SL SPS configuration index—3 bits as defined in subclause 14.2.1 of [3].
- Activation/release indication—1 bit as defined in subclause 14.2.1 of [3].

If the number of information bits in format 5A mapped onto a given search space is less than the payload size of format 0 mapped onto the same search space, zeros shall be appended to format 5A until the payload size equals that of format 0 including any padding bits appended to format 0. If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

[ . . . ]

5.4.3 Sidelink Control Information

An SCI transports sidelink scheduling information.

The processing for one SCI follows the downlink control information according to subclause 5.3.3, with the following differences:
- In the step of CRC attachment, no scrambling is performed.
- PUSCH interleaving is applied according to subclauses 5.2.2.7 and 5.2.2.8 without any control information in order to apply a time-first rather than frequency-first mapping, where $C_{max}=2 \cdot (N_{symb}^{SL}-1)$ and the sequence of bits f is equal to e. For SCI format 1, $C_{max}=2 \cdot (N_{symb}^{SL}-2)$.

5.4.3.1 SCI Formats

The fields defined in the SCI formats below are mapped to the information bits $a_0$ to $a_{A-1}$ as follows.

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

5.4.3.1.2 SCI Format 1

SCI format 1 is used for the scheduling of PSSCH.

The following information is transmitted by means of the SCI format 1:
- Priority—3 bits as defined in subclause 4.4.5.1 of [7].
- Resource reservation—4 bits as defined in subclause 14.2.1 of [3].
- Frequency resource location of initial transmission and retransmission—$\lceil \log_2(N_{subchannel}^{SL}(N_{subchannel}^{SL}+1)/2) \rceil$ bits as defined in subclause 14.1.1.4C of [3].
- Time gap between initial transmission and retransmission—4 bits as defined in subclause 14.1.1.4C of [3].
- Modulation and coding scheme—5 bits as defined in subclause 14.2.1 of [3].
- Retransmission index—1 bit as defined in subclause 14.2.1 of [3].
- Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.
- Reserved information bits are added until the size of SCI format 1 is equal to 32 bits. The reserved bits are set to zero.

3GPP TS 36.211 V15.4.0 (2018-12) discloses the generation of a physical sidelink shared channel and a physical sidelink control channel in LTE/LTE-A. The physical sidelink shared channel and the physical sidelink control channel provide communication between devices, i.e. PC5 link or device-to-device link. The physical sidelink shared channel (PSSCH) delivers data/transport block for a sidelink shared channel (SL-SCH). The physical sidelink control channel (PSCCH) delivers sidelink control information (SCI). The relevant portions of 3GPP TS 36.211 V15.4.0 (2018-12) are quoted below:

9 Sidelink 9.1 Overview

A sidelink is used for ProSe direct communication and ProSe direct discovery between UEs.

9.1.1 Physical channels

A sidelink physical channel corresponds to a set of resource elements carrying information originating from higher layers and is the interface defined between 3GPP TS 36.212 [3] and the present document 3GPP TS 36.211. The following sidelink physical channels are defined:
- Physical Sidelink Shared Channel, PSSCH
- Physical Sidelink Control Channel, PSCCH
- Physical Sidelink Discovery Channel, PSDCH
- Physical Sidelink Broadcast Channel, PSBCH Generation of the baseband signal representing the different physical sidelink channels is illustrated in Figure 5.3-1.

3GPP RP-182111 discloses the justification and objective of study item on NR V2X as quoted below:

3 Justification

To expand the 3GPP platform to the automotive industry, the initial standard on support of V2V services was completed in September 2016. Enhancements that focusing on additional V2X operation scenarios leveraging the cellular infrastructure, are completed in March 2017 as 3GPP V2X phase 1 for inclusion in Release 14 LTE. In Rel-14 LTE V2X, a basic set of requirements for V2X service in TR 22.885 has been supported, which are considered sufficient for basic road safety service. Vehicles (i.e., UEs supporting V2X applications) can exchange their own status information through sidelink, such as position, speed and heading, with other nearby vehicles, infrastructure nodes and/or pedestrians.

3GPP V2X phase 2 in Rel-15 introduces a number of new features in sidelink, including: carrier aggregation, high order modulation, latency reduction, and feasibility study on both transmission diversity and short TTI in sidelink. All these enhanced features in 3GPP V2X phase 2 are primary base on LTE and require co-existing with Rel-14 UE in same resource pool.

SA1 has completed enhancement of 3GPP support for V2X services (eV2X services). The consolidated requirements for each use case group are captured in TR 22.886, and a set of the normative requirements is defined in TS 22.186.

SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In 3GPP R1-1810051, RAN1 discloses agreements about New Radio (NR) V2X as quoted below:

Agreements:
RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to. Note that RAN1 has not made agreement about the difference among transmissions in unicast, groupcast, and broadcast manner.

RAN1 assumes that the physical layer knows the following information for a certain transmission belonging to a unicast or groupcast session. Note RAN1 has not made agreement about the usage of this information.

ID
Groupcast: destination group ID, FFS: source ID
Unicast: destination ID, FFS: source ID
HARQ process ID (FFS for groupcast)
RAN1 can continue discussion on other information Agreements:
RAN1 to study the following topics for the SL enhancement for unicast and/or groupcast. Other topics are not precluded.
HARQ feedback
CSI acquisition
Open loop and/or closed-loop power control
Link adaptation
Multi-antenna transmission scheme Agreements:
At least PSCCH and PSSCH are defined for NR V2X. PSCCH at least carries information necessary to decode PSSCH.

Agreements:
RAN1 to continue study on multiplexing physical channels considering at least the above aspects:
Multiplexing of PSCCH and the associated PSSCH (here, the "associated" means that the PSCCH at least carries information necessary to decode the PSSCH).
Study further the following options:
[ . . . ]
Option 3: A part of PSCCH and the associated PSSCH are transmitted using overlapping time resources in non-overlapping frequency resources, but another part of the associated PSSCH and/or another part of the PSCCH are transmitted using non-overlapping time resources.

Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources In 3GPP R1-1812101, RAN1 discloses agreements about NR V2X as quoted below:

Agreements:
Layer-1 destination ID is conveyed via PSCCH.
FFS how many bits are conveyed.
FFS details for each of the unicast/groupcast/broadcast cases
Additional Layer-1 ID(s) is conveyed via PSCCH at least for the purpose of identifying which transmissions can be combined in reception when HARQ feedback is in use.

Agreements:
For unicast, sidelink HARQ feedback and HARQ combining in the physical layer are supported.
FFS details, including the possibility of disabling HARQ in some scenarios
For groupcast, sidelink HARQ feedback and HARQ combining in the physical layer are supported.
FFS details, including the possibility of disabling HARQ in some scenarios Agreements:
Sidelink control information (SCI) is defined.
SCI is transmitted in PSCCH.
SCI includes at least one SCI format which includes the information necessary to decode the corresponding PSSCH.
NDI, if defined, is a part of SCI.

Sidelink feedback control information (SFCI) is defined.
SFCI includes at least one SFCI format which includes HARQ-ACK for the corresponding PSSCH.
FFS whether a solution will use only one of "ACK," "NACK," "DTX," or use a combination of them.
Agreements:
At least resource pool is supported for NR sidelink
Resource pool is a set of time and frequency resources that can be used for sidelink transmission and/or reception.
FFS whether a resource pool consists of contiguous resources in time and/or frequency.
A resource pool is inside the RF bandwidth of the UE.
FFS how gNB and other UEs know the RF bandwidth of the UE
UE assumes a single numerology in using a resource pool.
Multiple resource pools can be configured to a single UE in a given carrier.
In 3GPP R1-1901482, RAN1 discloses agreements about NR V2X as quoted below:
Agreements:
BWP is defined for NR sidelink.
In a licensed carrier, SL BWP is defined separately from BWP for Uu from the specification perspective.
FFS the relation with Uu BWP.
The same SL BWP is used for both Tx and Rx.
Each resource pool is (pre)configured within a SL BWP.
Only one SL BWP is (pre)configured for RRC idle or out of coverage NR V2X UEs in a carrier.
For RRC connected UEs, only one SL BWP is active in a carrier. No signalling is exchanged in sidelink for activation and deactivation of SL BWP.
Working assumption: only one SL BWP is configured in a carrier for a NR V2X UE
Revisit in the next meeting if significant issues are found
Numerology is a part of SL BWP configuration.
Working assumption:
Regarding PSCCH/PSSCH multiplexing, at least option 3 is supported for CP-OFDM.
RAN1 assumes that transient period is not needed between symbols containing PSCCH and symbols not containing PSCCH in the supported design of option 3.
Agreements:
Physical sidelink feedback channel (PSFCH) is defined and it is supported to convey SFCI for unicast and groupcast via PSFCH.
Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.
FFS whether to support SL HARQ feedback per CBG
Agreements:
When SL HARQ feedback is enabled for groupcast, the following operations are further studied for the non-CBG case:
Option 1: Receiver UE transmits HARQ-NACK on PSFCH if it fails to decode the corresponding TB after decoding the associated PSCCH. It transmits no signal on PSFCH otherwise.
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.
Agreements:
It is supported to enable and disable SL HARQ feedback in unicast and groupcast.
FFS when HARQ feedback is enabled and disabled.
In 3GPP R1-1901483, RAN1 discloses agreements about NR V2X as quoted below:
Agreements:
Layer-1 destination ID can be explicitly included in SCI
FFS how to determine Layer-1 destination ID
FFS size of Layer-1 destination ID
The following additional information can be included in SCI
Layer-1 source ID
FFS how to determine Layer-1 source ID
FFS size of Layer-1 source ID
HARQ process ID
NDI
RV
Agreements:
For determining the resource of PSFCH containing HARQ feedback, support that the time gap between PSSCH and the associated PSFCH is not signaled via PSCCH at least for modes 2(a)(c)(d) (if respectively supported)
FFS whether or not to additionally support other mechanism(s) for modes 2(a)(c)(d)
FFS for mode 1
Working Assumption:
When HARQ feedback is enabled for groupcast, support (options as identified in RAN1 #95):
Option 1: Receiver UE transmits only HARQ NACK
Option 2: Receiver UE transmits HARQ ACK/NACK
Agreements:
It is supported that in mode 1 for unicast, the in-coverage UE sends an indication to gNB to indicate the need for retransmission
At least PUCCH is used to report the information
If feasible, RAN1 reuses PUCCH defined in Rel-15
The gNB can also schedule re-transmission resource
Agreements:
SL open-loop power control is supported.
For unicast, groupcast, broadcast, it is supported that the open-loop power control is based on the pathloss between TX UE and gNB (if TX UE is in-coverage).
This is at least to mitigate interference to UL reception at gNB.
Rel-14 LTE sidelink open-loop power control is the baseline.
gNB should be able to enable/disable this power control.
At least for unicast, it is supported that the open-loop power control is also based on the pathloss between TX UE and RX UE.
(Pre-)configuration should be able to enable/disable this power control.

Agreements:
Mode-2 supports the sensing and resource (re)-selection procedures according to the previously agreed definitions.
Agreements:
Sub-channel based resource allocation is supported for PSSCH
Agreements:
SCI decoding applied during sensing procedure provides at least information on sidelink resources indicated by the UE transmitting the SCI
In 3GPP R1-1905837, RAN1 discloses agreements about NR V2X as quoted below:
Agreements:
For the operation regarding PSSCH, a UE performs either transmission or reception in a slot on a carrier.
Agreements:
At least for sidelink HARQ feedback, NR sidelink supports at least a PSFCH format which uses last symbol(s) available for sidelink in a slot.
Agreements:
For unicast RX UEs, SL-RSRP is reported to TX UE
For sidelink open loop power control for unicast for the TX UE, TX UE derives pathloss estimation
Revisit during the WI phase w.r.t. whether or not there is a need regarding how to handle pathloss estimation for OLPC before SL-RSRP is available for a RX UE
Agreements:
Blind retransmissions of a TB are supported for SL by NR-V2X
Agreements:
NR V2X Mode-2 supports reservation of sidelink resources at least for blind retransmission of a TB
Whether reservation is supported for initial transmission of a TB is to be discussed in the WI phase
Whether reservation is supported for potential retransmissions based on HARQ feedback is for the WI phase
Agreements:
Mode-2 sensing procedure utilizes the following sidelink measurement
L1 SL-RSRP based on sidelink DMRS when the corresponding SCI is decoded
In 3GPP R1-1905921, RAN1 discloses agreements about NR V2X as quoted below:
Agreements:
It is supported, in a resource pool, that within the slots associated with the resource pool, PSFCH resources can be (pre)configured periodically with a period of N slot(s)
N is configurable, with the following values
1
At least one more value >1
FFS details
The configuration should also include the possibility of no resource for PSFCH. In this case, HARQ feedback for all transmissions in the resource pool is disabled
HARQ feedback for transmissions in a resource pool can only be sent on PSFCH in the same resource pool
Agreements:
Support at least Sidelink CSI-RS for CQI/RI measurement
Sidelink CSI-RS is confined within the PSSCH transmission In 3GPP R1-1907973, RAN1 discloses agreements about NR V2X as quoted below:
Agreements:
Transmission of PSSCH is mapped onto contiguous PRBs only
Agreements:
Sub-channel size is (pre)configurable.
Conclusion:
If two-stage SCI is supported, the following details are used.
Information related to channel sensing is carried on 1st-stage.
2nd-stage is decoded by using PSSCH DMRS.
Polar coding used for PDCCH is applied to 2nd-stage
Payload size for 1st-stage in two-stage SCI case is the same for unicast, groupcast, and broadcast in a resource pool.
After decoding the 1st-stage, the receiver does not need to perform blind decoding of 2nd-stage.
Agreements:
Sidelink HARQ ACK/NACK report from transmitter UE to gNB is supported with details FFS. Note: this reverts the following agreement from RAN1 #96:
Sidelink HARQ ACK/NACK report from UE to gNB is not supported in Rel-16.
SR/BSR report to gNB for the purpose of requesting resources for HARQ retransmission is not supported.
Agreements:
Support a sub-channel as the minimum granularity in frequency domain for the sensing for PSSCH resource selection
No additional sensing for other channels
Agreements:
For the SL open-loop power control, a UE can be configured to use DL pathloss (between TX UE and gNB) only, SL pathloss (between TX UE and RX UE) only, or both DL pathloss and SL pathloss.
When the SL open-loop power control is configured to use both DL pathloss and SL pathloss,
The minimum of the power values given by open-loop power control based on DL pathloss and the open-loop power control based on SL pathloss is taken.
(Working assumption) PO and alpha values are separately (pre-)configured for DL pathloss and SL pathloss.
In 3GPP R1-1909942, RAN1 discloses agreements about NR V2X as quoted below:
Agreements:
In physical layer perspective, a (pre-)configured resource pool can be used for all of unicast, groupcast, and broadcast for a given UE.
There is no (pre-)configuration to inform which cast types are used for the resource pool.
Agreements:
Support 2-stage SCI
$1^{st}$ SCI is carried in PSCCH.
FFS: other details
Agreements:
At least for mode 2, The maximum number of SL resources $N_{MAX}$ reserved by one transmission including current transmission is [2 or 3 or 4]
Aim to select the particular number in RAN1 #98
$N_{MAX}$ is the same regardless of whether HARQ feedback is enabled or disabled Agreements:

In Mode-2, SCI payload indicates sub-channel(s) and slot(s) used by a UE and/or reserved by a UE for PSSCH (re-)transmission(s)

SL minimum resource allocation unit is a slot

Working Assumption:

An indication of a priority of a sidelink transmission is carried by SCI payload This indication is used for sensing and resource (re) selection procedures This priority is not necessarily the higher layer priority Agreements:

The resource (re-)selection procedure includes the following steps

Step 1: Identification of candidate resources within the resource selection window
FFS details Step 2: Resource selection for (re-)transmission(s) from the identified candidate resources
FFS details Agreements:

In Step 1 of the resource (re-)selection procedure, a resource is not considered as a candidate resource if:

The resource is indicated in a received SCI and the associated L1 SL-RSRP measurement is above an SL-RSRP threshold The SL-RSRP threshold is at least a function of the priority of the SL transmission indicated in the received SCI and the priority of the transmission for which resources are being selected by the UE In the email discussions after the 3GPP R1-1909942, RAN1 discloses agreements about NR V2X as quoted below:

Working Assumption in [98-NR-12]:

For SL-RSRP measurement/reporting for open-loop power control for PSCCH/PSSCH:

UE receiving RS for SL-RSRP measurement reports a filtered SL-RSRP (to be selected between L1-filtered SL-RSRP and L3-filtered SL-RSRP)

The transmit power of the RS is not indicated to UE receiving RS for this purpose.

FFS whether to introduce additional behavior, e.g., restriction on transmit power change.

FFS SL-RSRP reporting signaling details (e.g., which layer signaling is used).

All the power above is normalized with a certain bandwidth (e.g., a PRB or a sub-channel).

In 3GPP Draft Report of 3GPP TSG RAN WG1 #98bis v0.1.0, RAN1 discloses agreements about NR V2X as quoted below:

Agreements:

For the number of bits of L1 IDs,
Layer-1 destination ID: 16 bits
Layer-1 source ID: 8 bits Agreements:

PSCCH for $1^{st}$ stage SCI with 2 and 3 symbols is supported in Rel-16.

FFS: other length(s) of symbols (e.g., all symbols)

The number of symbols above excludes AGC symbols if any

The number of PSCCH symbols is explicitly (pre-)configured per Tx/Rx resource pool Agreements:

Resource mapping of SL CSI-RS is performed by using one SL CSI-RS pattern in an RB, where the possible patterns in an RB are a subset of NR Uu CSI-RS time-frequency/CDM resource mapping patterns in an RB The subset is to be pre-defined by spec FFS how the one pattern is determined (but not part of SCI)

FFS which subset

Agreements:

SL CSI-RS is transmitted by a UE only if:
when the corresponding PSSCH is transmitted (as agreed before) by the UE, and,
when SL CQI/RI reporting is enabled by higher layer signaling, and
when enabled, if the corresponding SCI by the UE triggers the SL CQI/RI reporting Agreements:

The $2^{nd}$ stage SCI is carried within the resource of the corresponding PSSCH.

Scrambling operation for the $2^{nd}$ stage SCI is applied separately with PSSCH Agreements:

Support {10, 15, 20, 25, 50, 75, 100} PRBs for possible sub-channel size.

FFS other values (e.g., 4, 5, 6, etc.)

One value of the above set is (pre)configured for the sub-channel size for the resource pool.

Size of PSCCH: X
$X \leq N$, where N is the number of PRBs of the subchannel
X is (pre)-configurable with values FFS, X Agreements:

To signal the gap between DCI reception and the first sidelink transmission scheduled by DCI:
A table of values is configured by RRC.
DCI determines which of the configured values is used.

Agreements:

For reporting SL HARQ-ACK to the gNB:

For dynamic grant and configured grant type-2 in SL, the Rel-15 procedure and signalling for DL HARQ-ACK are reused for the purpose of selecting PUCCH offset/resource and format in UL.

The configuration for SL is separate from Uu link for a UE

FFS how to indicate timing of transmission in PUCCH, including whether physical or logical slots are used For configured grant type-1 in SL, RRC is used to configure PUCCH offset/resource and format in UL (if supported)

Working Assumption:

Each transmission in a resource provided by a configured grant contains PSCCH and PSSCH.

Agreements:

For a configured grant in Mode 1 when using SL HARQ feedback:
There is only one HARQ-ACK bit for the configured grant
There is one PUCCH transmission occasion after the last resource in the set of resources provided by a configured grant.

Agreements:

L3-filtered sidelink RSRP reporting (from RX UE to TX UE) for open-loop power control for PSCCH/PSSCH uses higher layer signaling.

Details (e.g., reporting layer, triggering condition, etc.) are up to RAN2.

FFS: Other details

Agreements:
  For SL-RSRP measurement for SL open-loop power control, PSSCH DMRS is used
Agreements:
  For CQI/RI reporting on PSSCH:
    Higher layer signaling (e.g. MAC CE) is used for CQI/RI reporting
    Details up to RAN2
    SL CQI/RI measurement and derivation are based on the existing physical layer procedure for Uu
3GPP R1-1910059 discusses CSI acquisition as quoted below:
3. CSI acquisition
RAN #84 has the following objective for CSI acquisition.
  CSI acquisition for unicast [RAN1]
    CQI/RI reporting is supported and they are always reported together. No PMI reporting is supported in this work. Multi-rank PSSCH transmission is supported up to two antenna ports.
    In sidelink, CSI is delivered using PSSCH (including PSSCH containing CSI only) using the resource allocation procedure for data transmission.
The following agreements were further reached during the RAN1 #96bis meeting:
Agreements:
  Support at least Sidelink CSI-RS for CQI/RI measurement
  Sidelink CSI-RS is confined within the PSSCH transmission 3.2 PSSCH for CSI Report In some cases, data is only being sent from TX UE to RX UE, and there is no data pending for the RX UE to send to the TX UE. When the RX UE has no data to transmit, there are three possible options for CSI:
  Option 1: No CSI is sent.
  Option 2: CSI is sent in a PSSCH with dummy data.
  Option 3: CSI is sent with a compact-format PSSCH. Such PSSCH occupies less resource than a normal PSSCH and is transmitted in a CSI dedicated resource pool as in FIG. 7, which is reproduced as FIG. 10.

From the spectral efficiency perspective, option 1 uses less resource for CSI feedback. However, it may ignore critical demand for CSI feedback in some cases, such that it harms the reliability and efficiency of the system. Therefore option 1 is not a wise choice, and is why the WID requires the definition of "PSSCH containing CSI only". The drawback of option 2 is the overhead of dummy data. This overhead depends on the resources the PSSCH occupies. If the bandwidth of PSSCH, which is bounded by the minimum subchannel size, is rather large, the dummy data will bring considerable overhead. To address the issues above, we support option 3, i.e., a compact-format PSSCH in a resource pool dedicated for CSI reporting. The design details of compact-format PSSCH and CSI dedicated resource pool are presented in [10].

Proposal 20: When the RX UE has no data to transmit, it sends its CSI report with a compact-format PSSCH in a CSI dedicated resource pool.

Next, regarding how to convey CSI report in PSSCH, there can be following options:
  Option 1: CSI report is multiplexed in PSSCH.
  Option 2: CSI report is carried by MAC CE.

In option 1, several REs in PSSCH are occupied by CSI report. In this case, CSI report and data are encoded separately using different encoding schemes, which incurs higher decoding complexity at the TX UE. Also, to avoid erroneous decoding, the existence and location of CSI report should be indicated to the TX UE. In option 2 the CSI report is conveyed in a CSI MAC CE defined in FIG. 8. Using a MAC CE not only avoids the indication of the presence of a CSI report, but also enables the blind retransmission procedure for CSI reliability enhancement. Therefore, we prefer option 2.

Figure 11:
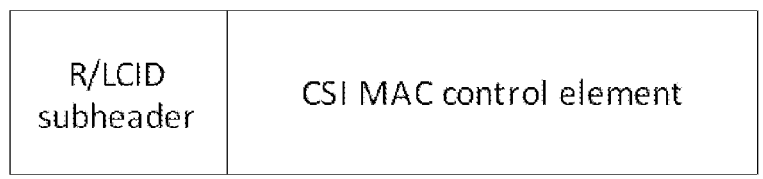
FIG. 11 is a reproduction of FIG. 8 entitled "CSI MAC CE" taken from 3GPP R1-1910059.

FIG. 8 is reproduced as FIG. 11.

Proposal 21: SL CSI report is carried by MAC CE in PSSCH.

3.3 SL CSI procedure 3.3.1 Triggering mechanism

In NR Uu, aperiodic CSI reporting is triggered by DCI and additionally by MAC CE. When DCI is used, a trigger state is initiated using the CSI request field, which indicates the CSI-RS resource sets and the Report Settings. When the bits of CSI request field are not enough, MAC CE is used to select a subset of trigger states and map them to the codepoints of the CSI request field.

Similar triggering mechanisms can be applied to SL. However, SCI may not be preferred since it reserves limited bits for indication of SL CSI-RS resource sets and Report Settings. Regarding different SL CSI-RS configurations and other potential functionalities besides CSI acquisition, multiple SL CSI-RS resource sets and Report Settings may be required. Thus, using a single bit field or several bits in SCI to trigger SL CSI reporting is inadequate and lacks scalability. To address this issue, we propose that no CSI request field is provided in SCI and SL CSI reporting should only be triggered by MAC CE, which is defined in FIG. 9. Such triggering mechanism does not impact the design of PSCCH or SCI, and offers good scalability.

When CSI reporting is triggered, the MAC CE indicates the existence of SL CSI-RS in the upcoming slot and requests the CSI simultaneously. Specifically, it indicates that SL CSI-RS will be transmitted in a PSSCH after X slots, where X can be (pre-)configured. It may also indicates that SL CSI report should be transmitted within some specified slots. Further details of SL CSI reporting can be found in Section 3.3.2. By defining SL CSI-RS and CSI report to be a one-to-one mapping, the signaling overhead is reduced. Nonetheless, SL CSI reporting can be disabled by higher layer signaling.

Figures 12, 13:
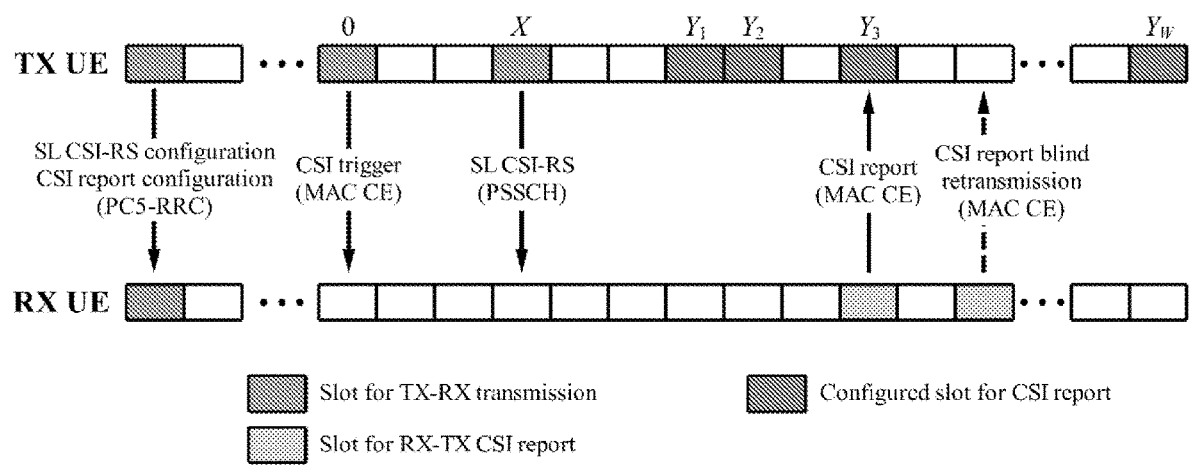
FIG. 12 is a reproduction of FIG. 9 entitled "CSI trigger MAC CE" taken from 3GPP R1-1910059.
FIG. 13 is a reproduction of FIG. 10 entitled "Slot offset list indicated to the RX UE for CSI report" taken from 3GPP R1-1910059.

Figure 9 is reproduced as FIG. 12.

Proposal 22: SL CSI reporting is triggered by MAC CE in PSSCH.

3.3.2 Configuration of CSI report

In NR Uu, the allowed slot offsets for aperiodic CSI report in PUSCH are configured by the higher layer parameter reportSlotOffsetList. Additionally, one single slot offset is further selected by the CSI trigger.

For NR V2X, similar slot offsets could be configured to save specification effort. The TX UE may indicate these slot offsets to the RX UE via PC5-RRC. However, one slot offset might be not enough since SL has to handle the cases where the PSSCH resource of the RX UE cannot be scheduled by the TX UE (e.g., non-mode 2d) or the gNB serving the TX UE (e.g., the TX UE and RX UE are in different cells or the RX UE is in mode 2). In such cases, if only one slot offset is assigned for CSI report, it is possible that the RX UE cannot obtain available resource for CSI report. To address this issue, we have the following design.

Figure 10:
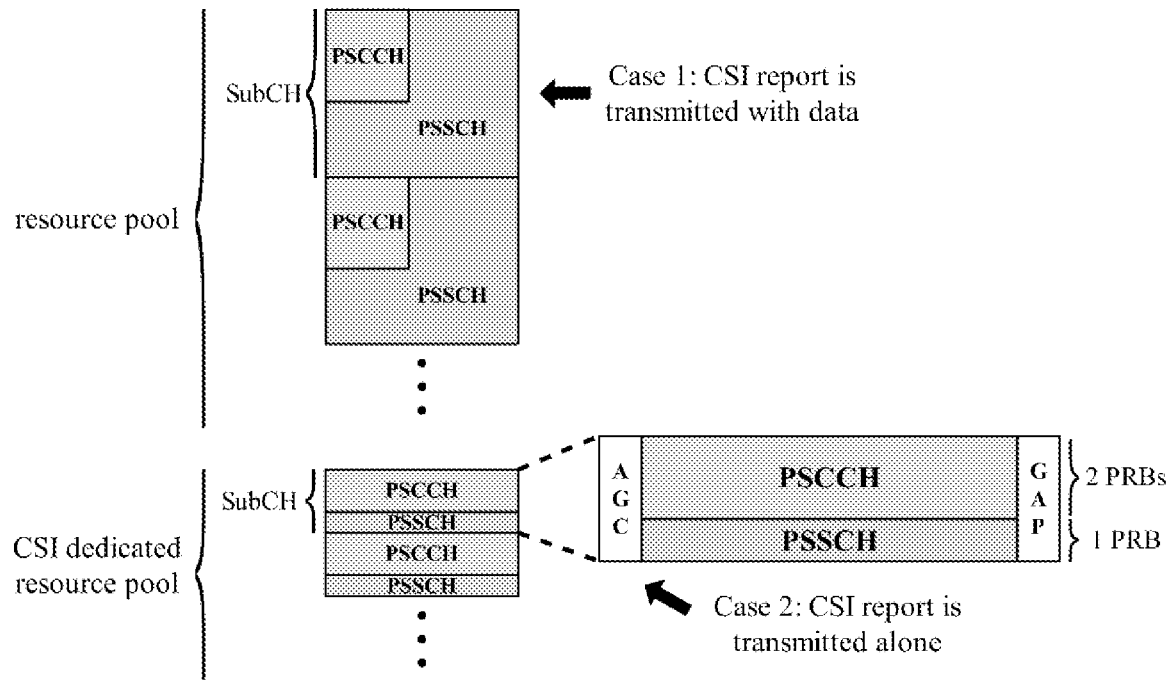
FIG. 10 is a reproduction of FIG. 7 entitled "Resource pool and CSI dedicated resource pool" taken from 3GPP R1-1910059.

FIG. 10 is reproduced as FIG. 13.

3GPP R1-1910538 discusses the sidelink CSI report and CSI-RS as quoted below:

4 Sidelink CSI Report and Sidelink CSI-RS

In this section, we further discuss the details of CSI acquisition for sidelink unicast, including CSI report and the corresponding sidelink CSI-RS (SCSI-RS). The focus in this paper is on CSI report over SL.

4.1 Sidelink CSI Report Procedures

Furthermore, it has been clarified in WID [1] that for sidelink unicast, CSI is delivered using PSSCH (including PSSCH containing CSI only) using the resource allocation procedure for data transmission.

Note that for a single UE, it is possible to have two scenarios:

1) CSI-report only transmission;
2) Simultaneous CSI report and data transmissions.

In general, there are two ways to carry CSI report over SL.

Option 1: Carried as a separate MAC CE or an RRC message,

Option 2: Piggybacked in PSSCH as the way of carrying UCI over PUSCH.

We see some drawbacks of option 2. First, a proper piggyback design requires a large amount of simulations to evaluate various RE mappings and @ offset values, which is quite challenging given the remaining WI time. Second, and more importantly, piggyback solution is not good for forward compatibility, since in a later release we may have more CSI report parameters and thus a larger CSI report size. In that case, the current RE mappings and p offset values may not be valid anymore. Third, piggybacking in PSSCH implies that coding similar to UL polar code is used for CSI reporting which is not favourable as every UE will have to implement the corresponding codec. Therefore, we believe that only option 1 should be supported.

SL CSI report piggyback on PSSCH is not supported.

When it comes to MAC CE and RRC, we think that MAC CE is more flexible compared to RRC. First, consider the scenario where a UE has both data and CSI report targeting the same receiver UE. If MAC CE is used to carry CSI report, data and CSI report can be formed as either one TB (i.e., one PSSCH) or two separate TBs (i.e., two PSSCHs). On the other hand, if RRC is used to carry CSI report, data and CSI report can only be formed as two separate TBs (i.e., two PSSCHs). Furthermore, if CSI report is carried via MAC CE with its specifically configured LCID, no additional signalling in SCI is needed to indicate the presence of SL CSI report in the TB transmission. In addition, when a UE has only CSI report to transmit or a UE's data and CSI report targets different UEs, the UE can form two separate TBs, irrespective of CSI report carried by MAC CE or RRC.

For carrying CSI report over sidelink, MAC CE is more flexible compared to RRC.

Whether MAC CE or RRC is eventually used to carry CSI report, we think that it is in RAN2 domain and RAN1 leaves it up to RAN2 to decide. Furthermore, prioritization between CSI report and data transmissions should also be done and is also specified by RAN2.

It is up to RAN2 to decide if MAC CE or RRC message is used to carry CSI reports and the respective details specific to the solution.

For aperiodic CSI-report triggering, the TX UE can trigger sidelink report when it is needed, e.g., to perform link adaptation, adaptation of transmission layers, etc. For this purpose, the TX UE can include an indication in SCI to trigger the CSI report from the RX UE.

An indication in SCI is used to trigger sidelink CSI report from the RX UE.

4.2 Sidelink CSI-RS Procedures

It has been agreed in RAN1 #96bis to support sidelink CSI-RS for CQI/RI measurement, where CSI-RS is confined with the PSSCH transmission.

The SL CSI-RS should be designed in such a way that it facilitates CSIT acquisition either in a reciprocity-based manner and/or in a feedback-based manner. Specifically, when channel reciprocity can be exploited, CSIT can be obtained using SL CSI-RS transmitted by the peer UE. On the other hand, when channel reciprocity does not hold, SL CSI-RS can be used to measure the channel and/or the interference which are then reported back to the transmitter to facilitate CSIT acquisition, which is considered as SL CSI report. Since SCSI-RS may or may not be present in a slot, we can use the SCI transmitted over PSCCH to indicate its presence.

The presence of SL CSI-RS in a slot is indicated by an SCI carried by the PSCCH.

More design aspects of SL CSI-RS can be found in our companion contribution [2].

3GPP TS 38.321 V15.6.0 (2019-06) discloses the Scheduling Request and Buffer Status Reporting as quoted below:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (clause 5.4.5) (if such a configuration exists) is considered as corresponding SR configuration for the triggered SR.

RRC configures the following parameters for the scheduling request procedure:

sr-ProhibitTimer (per SR configuration);

sr-TransMax (per SR configuration).

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see clause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.
As long as at least one SR is pending, the MAC entity shall for each pending SR:
  1> if the MAC entity has no valid PUCCH resource configured for the pending SR:
    2> initiate a Random Access procedure (see clause 5.1) on the SpCell and cancel the pending SR.
  1> else, for the SR configuration corresponding to the pending SR:
    2> when the MAC entity has an SR transmission occasion on the valid PUCCH resource for SR configured; and
    2> if sr-ProhibitTimer is not running at the time of the SR transmission occasion; and
    2> if the PUCCH resource for the SR transmission occasion does not overlap with a measurement gap; and
    2> if the PUCCH resource for the SR transmission occasion does not overlap with a UL-SCH resource:
      3> if SR_COUNTER<sr-TransMax:
        4> increment SR_COUNTER by 1;
        4> instruct the physical layer to signal the SR on one valid PUCCH resource for SR;
        4> start the sr-ProhibitTimer.
      3> else:
        4> notify RRC to release PUCCH for all Serving Cells;
        4> notify RRC to release SRS for all Serving Cells;
        4> clear any configured downlink assignments and uplink grants;
        4> clear any PUSCH resources for semi-persistent CSI reporting;
        4> initiate a Random Access procedure (see clause 5.1) on the SpCell and cancel all pending SRs.
  NOTE 1: The selection of which valid PUCCH resource for SR to signal SR on when the MAC entity has more than one overlapping valid PUCCH resource for the SR transmission occasion is left to UE implementation.
  NOTE 2: If more than one individual SR triggers an instruction from the MAC entity to the PHY layer to signal the SR on the same valid PUCCH resource, the SR_COUNTER for the relevant SR configuration is incremented only once.
The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see clause 5.4.5) prior to the MAC PDU assembly, or when the UL grant(s) can accommodate all pending data available for transmission.
5.4.5 Buffer Status Reporting
The Buffer Status reporting (BSR) procedure is used to provide the serving gNB with information about UL data volume in the MAC entity.
RRC configures the following parameters to control the BSR:
  periodicBSR-Timer;
  retxBSR-Timer;
  logicalChannelSR-DelayTimerApplied;
  logicalChannelSR-DelayTimer;
  logicalChannelSR-Mask;
  logicalChannelGroup.

Each logical channel may be allocated to an LCG using the logicalChannelGroup. The maximum number of LCGs is eight.
The MAC entity determines the amount of UL data available for a logical channel according to the data volume calculation procedure in TSs 38.322 [3] and 38.323 [4].
A BSR shall be triggered if any of the following events occur:
  UL data, for a logical channel which belongs to an LCG, becomes available to the MAC entity; and either
    this UL data belongs to a logical channel with higher priority than the priority of any logical channel containing available UL data which belong to any LCG; or
    none of the logical channels which belong to an LCG contains any available UL data.
    in which case the BSR is referred below to as 'Regular BSR';
  UL resources are allocated and number of padding bits is equal to or larger than the size of the Buffer Status Report MAC CE plus its subheader, in which case the BSR is referred below to as 'Padding BSR';
  retxBSR-Timer expires, and at least one of the logical channels which belong to an LCG contains UL data, in which case the BSR is referred below to as 'Regular BSR';
  periodicBSR-Timer expires, in which case the BSR is referred below to as 'Periodic BSR'.
  NOTE: When Regular BSR triggering events occur for multiple logical channels simultaneously, each logical channel triggers one separate Regular BSR.
For Regular BSR, the MAC entity shall:
  1> if the BSR is triggered for a logical channel for which logicalChannelSR-DelayTimerApplied with value true is configured by upper layers:
    2> start or restart the logicalChannelSR-DelayTimer.
  1> else:
    2> if running, stop the logicalChannelSR-DelayTimer.
For Regular and Periodic BSR, the MAC entity shall:
  1> if more than one LCG has data available for transmission when the MAC PDU containing the BSR is to be built:
    2> report Long BSR for all LCGs which have data available for transmission.
  1> else:
    2> report Short BSR.
For Padding BSR:
  1> if the number of padding bits is equal to or larger than the size of the Short BSR plus its subheader but smaller than the size of the Long BSR plus its subheader:
    2> if more than one LCG has data available for transmission when the BSR is to be built:
      3> if the number of padding bits is equal to the size of the Short BSR plus its subheader:
        4> report Short Truncated BSR of the LCG with the highest priority logical channel with data available for transmission.
      3> else:
        4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.

2> else:
3> report Short BSR.
1> else if the number of padding bits is equal to or larger than the size of the Long BSR plus its subheader:
2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered. The MAC entity shall:
1> if the Buffer Status reporting procedure determines that at least one BSR has been triggered and not cancelled:
2> if UL-SCH resources are available for a new transmission and the UL-SCH resources can accommodate the BSR MAC CE plus its subheader as a result of logical channel prioritization:
3> instruct the Multiplexing and Assembly procedure to generate the BSR MAC CE(s);
3> start or restart periodicBSR-Timer except when all the generated BSRs are long or short Truncated BSRs;
3> start or restart retxBSR-Timer.
2> if a Regular BSR has been triggered and logicalChannelSR-DelayTimer is not running:
3> if there is no UL-SCH resource available for a new transmission; or
3> if the MAC entity is configured with configured uplink grant(s) and the Regular BSR was triggered for a logical channel for which logicalChannelSR-Mask is set tofalse; or
3> if the UL-SCH resources available for a new transmission do not meet the LCP mapping restrictions (see clause 5.4.3.1) configured for the logical channel that triggered the BSR:
4> trigger a Scheduling Request.

NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

NOTE: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

3GPP TS 36.321 V15.7.0 (2019-09) discusses logical channel prioritization and buffer status report for sidelink as disclosed below:

5.14.1.3 Multiplexing and Assembly

For PDU(s) associated with one SCI, MAC shall consider only logical channels with the same Source Layer-2 ID-Destination Layer-2 ID pair.

Multiple transmissions within overlapping SC periods to different ProSe Destinations are allowed subject to single-cluster SC-FDM constraint.

In V2X sidelink communication, multiple transmissions for different Sidelink processes are allowed to be independently performed in different subframes.

5.14.1.3.1 Logical Channel Prioritization

The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in TS 36.323 [4], the MAC entity shall map different sidelink logical channels which correspond to the same PDCP entity onto different carriers in accordance with clause 5.14.1.5, or onto different carriers of different carrier sets (if configured in allowedCarrierFreqList for the corresponding destination). For a given sidelink logical channel, it is up to UE implementation which carrier set to select among the carrier sets configured in allowedCarrierFreqList (if configured) for the corresponding destination.

The MAC entity shall perform the following Logical Channel Prioritization procedure either for each SCI transmitted in an SC period in sidelink communication, or for each SCI corresponding to a new transmission in V2X sidelink communication:

The MAC entity shall allocate resources to the sidelink logical channels in the following steps:
Only consider sidelink logical channels not previously selected for this SC period and the SC periods (if any) which are overlapping with this SC period, to have data available for transmission in sidelink communication;
Only consider sidelink logical channels which meet the following conditions:
allowed on the carrier where the SCI is transmitted for V2X sidelink communication, if the carrier is configured by upper layers according to TS 36.331 [8] and TS 24.386 [15];
having a priority whose associated threshCBR-FreqReselection is no lower than the CBR of the carrier when the carrier is (re-)selected in accordance with 5.14.1.5;
Only consider one sidelink logical channel among sidelink logical channels corresponding to same PDCP entity, if duplication is activated as specified in TS 36.323 [4].
Step 0: Select a ProSe Destination, having the sidelink logical channel with the highest priority, among the sidelink logical channels having data available for transmission and having the same transmission format as the one selected corresponding to the ProSe Destination;
NOTE: The sidelink logical channels belonging to the same ProSe Destination have the same transmission format.

For each MAC PDU associated to the SCI:
  Step 1: Among the sidelink logical channels belonging to the selected ProSe Destination and having data available for transmission, allocate resources to the sidelink logical channel with the highest priority;
  Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.

The UE shall also follow the rules below during the scheduling procedures above:
  the UE should not segment an RLC SDU (or partially transmitted SDU) if the whole SDU (or partially transmitted SDU) fits into the remaining resources;
  if the UE segments an RLC SDU from the sidelink logical channel, it shall maximize the size of the segment to fill the grant as much as possible;
  the UE should maximise the transmission of data;
  if the MAC entity is given a sidelink grant size that is equal to or larger than 10 bytes (for sidelink communication) or 11 bytes (for V2X sidelink communication) while having data available for transmission, the MAC entity shall not transmit only padding.

5.14.1.3.2 Multiplexing of MAC SDUs

The MAC entity shall multiplex MAC SDUs in a MAC PDU according to clauses 5.14.1.3.1 and 6.1.6.

5.14.1.4 Buffer Status Reporting

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroup/nfoList, as specified in TS 36.331 [8]. LCG is defined per ProSe Destination.

A sidelink Buffer Status Report (BSR) shall be triggered if any of the following events occur:
  if the MAC entity has a configured SL-RNTI or a configured SL-V-RNTI:
    SL data, for a sidelink logical channel of a ProSe Destination, becomes available for transmission in the RLC entity or in the PDCP entity (the definition of what data shall be considered as available for transmission is specified in TS 36.322 [3] and TS 36.323 [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
    UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
    retx-BSR-TimerSL expires and the MAC entity has data available for transmission for any of the sidelink logical channels, in which case the Sidelink BSR is referred below to as "Regular Sidelink BSR";
    periodic-BSR-TimerSL expires, in which case the Sidelink BSR is referred below to as "Periodic Sidelink BSR";
  else:
    An SL-RNTI or an SL-V-RNTI is configured by upper layers and SL data is available for transmission in the RLC entity or in the PDCP entity (the definition of what data shall be considered as available for transmission is specified in TS 36.322 [3] and TS 36.323 [4] respectively), in which case the Sidelink BSR is referred below to as "Regular Sidelink BSR".

For Regular and Periodic Sidelink BSR:
  if the number of bits in the UL grant is equal to or larger than the size of a Sidelink BSR containing buffer status for all LCGs having data available for transmission plus its subheader:
    report Sidelink BSR containing buffer status for all LCGs having data available for transmission;
  else report Truncated Sidelink BSR containing buffer status for as many LCGs having data available for transmission as possible, taking the number of bits in the UL grant into consideration.

For Padding Sidelink BSR:
  if the number of padding bits remaining after a Padding BSR has been triggered is equal to or larger than the size of a Sidelink BSR containing buffer status for all LCGs having data available for transmission plus its subheader:
    report Sidelink BSR containing buffer status for all LCGs having data available for transmission;
  else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:
  if the MAC entity has UL resources allocated for new transmission for this TTI and the allocated UL resources can accommodate a Sidelink BSR MAC control element plus its subheader as a result of logical channel prioritization:
    instruct the Multiplexing and Assembly procedure to generate the Sidelink BSR MAC control element(s);
    start or restart periodic-BSR-TimerSL except when all the generated Sidelink BSRs are Truncated Sidelink BSRs;
    start or restart retx-BSR-TimerSL;
  else if a Regular Sidelink BSR has been triggered:
    if an uplink grant is not configured:
      a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

Some or all of the following terminology and assumption may be used hereafter.

Base Station (BS): a network central unit or a network node in NR which is used to control one or multiple Transmission/Reception Points (TRPs) which are associated with one or multiple cells. Communication between BS and TRP(s) is via fronthaul. BS may be referred to as central unit (CU), eNB, gNB, or NodeB.

TRP: a transmission and reception point provides network coverage and directly communicates with UEs. TRP may be referred to as distributed unit (DU) or network node.

Cell: a cell is composed of one or multiple associated TRPs, i.e. coverage of the cell is composed of coverage of all associated TRP(s). One cell is controlled by one BS. A cell may be referred to as TRP group (TRPG).

New Radio-Physical Downlink Control Channel (NR-PDCCH): A channel carries downlink control signal which is used to control communication between a UE and a network side. A network transmits NR-PDCCH on configured control resource set (CORESET) to the UE.

Uplink (UL)-control signal: An UL-control signal may be scheduling request (SR), channel state information (CSI), Hybrid Automatic Repeat reQuest —Acknowledgement (HARQ-ACK)/Negative Acknowledgement (NACK) for downlink transmission Slot: a scheduling unit in NR. Slot duration is 14 Orthogonal Frequency Division Multiplexing (OFDM) symbols.

Mini-slot: a scheduling unit with duration less than 14 OFDM symbols.

Slot format information (SFI): Information of slot format of symbols in a slot. A symbol in a slot may belong to following type: downlink, uplink, unknown or other. The slot format of a slot could at least convey transmission direction of symbols in the slot.

Downlink (DL) common signal: data channel carrying common information that targets for multiple UEs in a cell or all UEs in a cell. An example of DL common signal could be system information, paging, or Random Access Response (RAR).

For the network side:

Downlink timing of TRPs in the same cell are synchronized.

Radio Resource Control (RRC) layer of the network side is in the BS.

For the UE side:

There are at least two UE (RRC) states: connected state (or called active state) and non-connected state (or called inactive state or idle state). The inactive state may be an additional state or belong to connected state or non-connected state.

For NR V2X transmission, there are two transmission modes as disclosed in 3GPP R1-1810051:

mode 1 is that base station/network node can schedule sidelink resource(s) to be used by UE for sidelink transmission(s), which concept is similar as sidelink transmission mode 3 in LTE/LTE, which is discussed in 3GPP TS 36.214 V15.3.0 (2018-09); and mode 2 is that UE determines (i.e. base station/network node does not schedule) sidelink transmission resource(s) within sidelink resources configured by base station/network node or pre-configured sidelink resources, which concept is similar as sidelink transmission mode 4 in LTE/LTE-A, which is discussed in 3GPP TS 36.214 V15.3.0 (2018-09).

For a network scheduling mode, the network node may transmit a sidelink (SL) grant on the Uu interface for the scheduling resources of Physical Sidelink Control Channel (PSCCH) and/or Physical Sidelink Shared Channel (PSSCH). The V2X UE may perform PSCCH and PSSCH transmissions on a PC5 interface, in response to the receipt of a sidelink grant. The Uu interface means the wireless interface for communication between network and UE. The PC5 interface means the wireless interface for communication (directly) between UEs/devices.

For a UE selection mode, since the transmission resource is not scheduled via the network, the UE may require performance of a sensing before selecting a resource for the transmission (e.g., sensing-based transmission) in order to avoid resource collision and interference from or to other UEs. Based on the sensing procedure, the UE can determine a valid resource set. The valid resource set may be reported to higher layers for transmission from the UE. The UE may select one or multiple valid resources from the valid resource set to perform sidelink transmission(s) from the UE. The transmission(s) from the UE may be a PSCCH and/or PSSCH transmission.

In NR V2X, unicast, groupcast, and broadcast sidelink transmissions are supported. At least two sidelink resource allocation modes (e.g., network scheduling mode and UE selection mode) are defined for NR-V2X sidelink communication as disclosed in 3GPP R1-1810051.

Since NR V2X has a requirement of high reliability and high throughput, it is considered to support HARQ feedback for a unicast and/or groupcast. This means that a Transmit (TX) UE transmits a sidelink data transmission to a Receive (RX) UE, and then the RX UE may transmit a HARQ feedback to the TX UE.

Moreover, to increase high reliability and reduce interference, NR V2X supports sidelink power control based on sidelink pathloss as discussed in 3GPP R1-1901483. The sidelink pathloss open-loop power control means the pathloss for deriving a transmit power is the propagation pathloss between UE and UE (between device and device), instead of between the network node and the UE/device. Since the transmission power derivation can be enhanced with the consideration of channel quality and propagation pathloss between the TX UE and RX UE(s). With an accurate transmit power control, the reception reliability of a V2X transmission can be guaranteed without inducing unnecessary interference with other UEs. Power utilization is more efficient without wasting unnecessary transmit power. Accordingly, it is agreed for unicast RX UE to report L3-filtered Sidelink-Reference Signal Received Power (SL-RSRP) to the TX UE as discussed in 3GPP R1-1905837 and TSG RAN WG1 #98bis v0.1.0. The TX UE can derive a sidelink pathloss between the TX UE and the RX UE based on the reported SL-RSRP. The sidelink pathloss can be derived as the power difference between transmit power and the reported SL-RSRP.

NR V2X also supports sidelink power control based on downlink pathloss as disclosed in 3GPP R1-1907973. The motivation is avoiding severe uplink interference due to sidelink transmission, since sidelink and uplink transmissions may occur in the same frequency. Moreover, sidelink open-loop power control can be configured to use both DL and SL pathloss. The open-loop power control based on DL pathloss can be considered as the upper bound of sidelink transmit power. Alternatively, considering the different channel characteristic of the Uu interface and the PC5 interface, PO and alpha values may be separately (pre-) configured for DL pathloss and SL pathloss.

Furthermore, NR V2X supports sidelink Channel State Information-Reference Signal (CSI-RS) for Channel Quality Indicator/Rank Indicator (CQI/R1) measurement as disclosed in 3GPP R1-1905921. The TX UE can transmit a SL CSI-RS with SL CQI/R1 reporting triggering in a corresponding Sidelink Control Information (SCI), wherein the SL CSI-RS is transmitted with a corresponding PSSCH scheduled by the corresponding SCI as disclosed in 3GPP TSG RAN WG1 #98bis v0.1.0. Accordingly, the RX UE may perform SL CQI/R1 measurement and derivation based on the SL CSI-RS. The RX UE may deliver the derived CQI/RI value to the higher layer. The higher layer of the RX UE may generate a higher layer signaling (e.g., a Medium Access Control (MAC) Control Element (CE)) for reporting the derived CQI/RI value, and the higher layer then delivers the higher layer signaling (e.g., a MAC CE for CQI/R1 reporting) and/or sidelink data to the physical layer of the RX UE. The RX UE may perform the SL transmission containing the higher layer signaling and/or sidelink data to the TX UE. When the TX UE receives the SL transmission and acquires the CQI/RI value from the higher layer signaling, the TX UE can perform link adaption and adjust some transmission parameters (e.g., Modulating and Coding Scheme (MCS), layer selection, antenna/beam selection, code rate, or modulation order) for the following sidelink communication from the TX UE to the RX UE.

In summary, there is a need to utilize higher layer signaling to report a measurement result. Alternatively, the measurement result may be L3-filtered Reference Signal Received Power (RSRP) value. The higher layer signaling may be a MAC CE for RSRP reporting. The higher layer signaling may be a Radio Resource Control (RRC) message for RSRP reporting. Alternatively, the measurement result may be channel state information (CSI). The CSI may comprise any of CQI, R1, and/or Precoding Matrix Indicator (PMI). The higher layer signaling may be a MAC CE for CSI reporting. The higher layer signaling may be a RRC message for CSI reporting. Other measurement results are still possible if there is a benefit for sidelink communication, such as any of SL Buffer Status Report (BSR), SL Power Headroom Report (PHR), or SL channel sensing result. It should be noted that the higher layer signaling for reporting measurement result may not be regarded/considered as sidelink data because the measurement result does not come from the logical channel/Radio Bearer (RB).

Now, if the RX UE is operating in a network scheduling mode (e.g. mode 1), the sidelink resource(s) for sidelink transmission from RX UE to TX UE requires scheduling from the network. The network may schedule sidelink resources based on the SL buffer status reporting from the RX UE. However, since the higher layer signaling for reporting measurement result may not be regarded/considered as sidelink data, the SL buffer status reporting cannot be triggered by the higher layer signaling. Moreover, the SL buffer status reporting does not take into account the need of the higher layer signaling. Thus, if the RX UE is required to report the measurement result and there is no sidelink data from the RX UE to the TX UE, the RX UE may not acquire the resources for reporting the measurement result. In this case, if the higher layer signaling is for a RSRP report, the TX UE cannot adjust suitable/proper transmit power. This will induce degradation of data reception reliability and/or interference. If the higher layer signaling is for a CSI report, the TX UE cannot perform link adaption. This may harm reliability and efficiency of the system.

To acquire resources for the reporting the measurement result or some higher layer signaling, the following methods are disclosed.

In one method, a report (signaling) can trigger a buffer status report to the network. More specifically, a sidelink report (signaling) can trigger sidelink buffer status report to the network. In other words, a (regular) sidelink buffer status report could be triggered in response to a sidelink report (signaling). The sidelink report (signaling) could be available for a sidelink transmission to a second device.

In one embodiment, a first device may receive a configuration for operating in a network scheduling mode for acquiring sidelink resource(s), wherein the sidelink resource(s) are utilized for sidelink communication with at least a second device. When the first device is required to deliver/transmit a report (signaling) to at least the second device, and when the first device has no sidelink data to at least the second device (for a specific time from the required delivery/transmission of the report (signaling)), the first device may trigger a sidelink buffer status report to network. When or after the network receives the sidelink buffer status report, the network may schedule a sidelink resource(s) (e.g., associated with the second device) via the sidelink grant to the first device. The first device may utilize the sidelink resource(s) for transmitting the report (signaling) to at least the second device.

Alternatively, the first device may have available sidelink data required to transmit to a third device different from the second device.

Alternatively, the report (signaling) does not belong to a logical channel. In another alternative, the report (signaling) may be a control signaling.

In another alternative, the report (signaling) may be a MAC control element (e.g., MAC CE). Alternatively, the report (signaling) may be a RRC message. Alternatively, the report (signaling) does not include Radio Link Control (RLC) Protocol Data Unit (PDU). Alternatively, the report (signaling) does not include data from the Packet Data Convergence Protocol (PDCP) layer. Alternatively, the report (signaling) includes value(s) derived/indicated from the physical layer. Alternatively, the report (signaling) may be generated when the corresponding value(s) derived from the physical layer is acquired. Alternatively, the report (signaling) may be generated when the corresponding value(s) is delivered/indicated from a physical layer to the corresponding layer of the report (signaling). Alternatively, the report (signaling) may be generated when the first device has an available sidelink resource for delivering/transmitting the triggered report (signaling). Alternatively, the report (signaling) may be assembled into a MAC PDU when the first device has available sidelink resources for delivering/transmitting the triggered report (signaling). Alternatively, the value(s) could be CQI value, RI value, RSRP value, PHR value, or any combination thereof.

Alternatively, the sidelink buffer status report may indicate the need of the report (signaling). Alternatively, the sidelink buffer status report may indicate the sidelink buffer status as zero. Alternatively, the sidelink buffer status report may indicate the sidelink buffer status with a virtual size. The virtual size may be derived based on at least the size of the report (signaling). The virtual size may be a fixed/specified/(pre-)configured value. Alternatively, the sidelink buffer status (only) considers the sidelink buffer(s) (associated with the sidelink logical channel(s)) from the first device to at least the second device.

Alternatively, when the first device does not have uplink resources for delivering/transmitting the sidelink buffer status report, the sidelink buffer status report may trigger a (sidelink) scheduling request (e.g., SR) from the first device to the network. When the network receives/detects the (sidelink) scheduling request from the first device, the network may schedule an uplink resource to the first device, and the first device may utilize the uplink resource for delivering/transmitting the sidelink buffer status report to network.

Alternatively, when the first device has an available uplink resource for delivering/transmitting the sidelink buffer status report, the first device delivers/transmits the sidelink buffer status report via the uplink resource.

Alternatively, if the first device has an available sidelink resource for performing a sidelink transmission to at least the second device, the first device may not trigger the sidelink buffer status report to the network. The first device may utilize the available sidelink resource for delivering/transmitting the report (signaling).

According to another method, a report (signaling) can trigger a scheduling request to the network. More specifically, a sidelink report (signaling) can trigger a sidelink scheduling request to the network. Alternatively, the report (signaling) may or may not trigger a sidelink buffer status report to network.

In one embodiment, a first device may receive a configuration for operating in a network scheduling mode for acquiring sidelink resource(s), wherein the sidelink resource(s) are utilized for sidelink communications with at least a second device. When the first device is required to deliver/transmit a report (signaling) to at least the second device, and when the first device has no sidelink data to at least the second device (for a specific time from the required delivery/transmission of the report (signaling)), the first device may trigger a sidelink scheduling request to the network. When or after the network receives and/or detects the sidelink scheduling request, the network may schedule sidelink resource(s) to the first device. The first device may utilize the sidelink resource(s) for delivering/transmitting the report (signaling) to at least the second device.

Alternatively, the condition, "when the first device requires to deliver/transmit a report (signaling) to at least the second device," may be represented, replaced, or interpreted as "when the first device generates a report (signaling) to at least the second device."

Alternatively, the condition, "when the first device requires to deliver/transmit a report (signaling) to at least the second device," may be represented, replaced, or interpreted as "when the first device triggers or is triggered to deliver/transmit a report (signaling) to at least the second device."

Alternatively, the condition, "when the first device has no sidelink data to at least the second device" may be represented, replaced, or interpreted as "when the first device does not have available sidelink data, to at least the second device, with higher priority than the report (signaling)."

Alternatively, the condition, "when the first device has no sidelink data to at least the second device" may be represented, replaced, or interpreted as "when all available sidelink data from the first device to at least the second device are with lower priority than the report (signaling)."

Alternatively, the condition, "when the first device has no sidelink data to at least the second device" may be represented, replaced, or interpreted as "when the first device has no available sidelink resource for delivering/transmitting the report (signaling) to at least the second device."

Alternatively, the first device may have available sidelink data required to transmit to a third device different from the second device.

Alternatively, the report (signaling) does not belong to a logical channel. Alternatively, the report (signaling) may be a control signaling.

Alternatively, the report (signaling) may be a MAC control element. Alternatively, the report (signaling) may be a RRC message. Alternatively, the report (signaling) does not include RLC PDU. Alternatively, the report (signaling) does not include data from the PDCP layer. Alternatively, the report (signaling) may be generated when the corresponding value(s) derived from the physical layer is acquired. Alternatively, the report (signaling) may be generated when the corresponding value(s) is delivered/indicated from the physical layer to the corresponding layer of the report (signaling). Alternatively, the report (signaling) may be generated when the first device has an available sidelink resource for delivering/transmitting the triggered report (signaling). Alternatively, the report (signaling) may be assembled into a MAC PDU when the first device has an available sidelink resource for delivering/transmitting the triggered report (signaling). Alternatively, the report (signaling) includes value(s) derived/indicated from the physical layer. Alternatively, the value(s) could be a CQI value, RI value, RSRP value, PHR value, or any combination thereof.

Alternatively, the report (signaling) may be triggered when the first device receives a physical layer signaling with a corresponding report triggering. Alternatively, the physical layer signaling is transmitted from the second device. Alternatively, the report (signaling) may be triggered when the first device receives a triggering MAC control element with corresponding report triggering. Alternatively, the triggering MAC control element is transmitted from the second device.

Alternatively, the first device receives a configuration, from the network, with at least one SR (scheduling request) configuration for transmitting a (signaling of) sidelink scheduling request. Alternatively, (a signaling of) the sidelink scheduling request is transmitted via Physical Uplink Control Channel (PUCCH).

Additionally or alternatively, at least one SR configuration could be associated with (the need of transmitting) sidelink report (signaling). Alternatively, a SR configuration identity (index) could be associated with sidelink report (signaling) (only). Alternatively, the SR configuration identity (index) could not be associated with the sidelink logical channel.

Alternatively, the sidelink scheduling request may indicate the need of the report (signaling). Alternatively, the sidelink scheduling request may indicate a need of a small size of the sidelink resource. The smaller size includes at least the size of the report (signaling). The smaller size may be a fixed/specified/(pre-)configured value. Alternatively, the small size may be any of 2, 4, 6, 8, or 10 bytes.

Alternatively, if the first device also sends a (regular) sidelink buffer status report to network, the sidelink scheduling request may indicate the need for a larger and/or normal size of the sidelink resource.

Alternatively, the first device transmits (a signaling of) the sidelink scheduling request to the network when the first device does not have an available uplink resource for performing the PUSCH transmission. Alternatively, the first device transmits (a signaling of) the sidelink scheduling request to the network even when the first device has an available uplink resource for performing the PUSCH transmission. Alternatively, the available uplink resource and the (signaling) transmission of the sidelink scheduling request may or may not overlap in the time domain.

Alternatively, the sidelink scheduling request can be triggered even when the first device has available uplink resource for performing PUSCH transmission. Alternatively, when the first device has an available uplink resource for performing PUSCH transmission, the sidelink scheduling request is not canceled.

Alternatively, if the first device has an available sidelink resource for performing sidelink transmission to at least the second device, the first device may not trigger the sidelink scheduling request to the network. The first device may utilize the available sidelink resource for delivering the report (signaling).

According to another method, a first device receives a configuration for operating in a network scheduling mode for acquiring sidelink resource(s), the first device may select a sidelink resource based on sensing and transmits a report (signaling) via the selected sidelink resource. More specifically, when the first device receives a configuration for operating in network scheduling mode, the first device can switch to a UE selection mode for acquiring sidelink resources for delivering a report (signaling).

In one embodiment, a first device may receive a configuration for operating in network scheduling mode for acquiring sidelink resource(s), wherein the sidelink resource(s) are utilized for sidelink communication with at least a second device. When the first device is required to deliver/transmit a report (signaling) to at least the second device, and when the first device has no sidelink data to at least the second device (for a specific time from the required delivery/transmission of the report (signaling), the first device may select a sidelink resource based on sensing and utilize the selected sidelink resource for delivering/transmitting the report (signaling) to at least the second device. Alternatively, the first device may not utilize the selected sidelink resource for delivering/transmitting sidelink data to at least the second device.

Alternatively, the condition "when the first device requires to deliver/transmit a report (signaling) to at least the second device" may be represented, replaced, or interpreted as "when the first device generates a report (signaling) to at least the second device."

Alternatively, the condition "when the first device requires to deliver/transmit a report (signaling) to at least the second device" may be represented, replaced, or interpreted as "when the first device triggers or is triggered to deliver/transmit a report (signaling) to at least the second device."

Alternatively, the condition "when the first device has no sidelink data to at least the second device" may be represented, replaced, or interpreted as "when the first device does not have an available sidelink data, to at least the second device, with higher priority than the report (signaling)."

Alternatively, the condition "when the first device has no sidelink data to at least the second device" may be represented, replaced, or interpreted as "when all available sidelink data from the first device to at least the second device are with lower priority than the report (signaling)."

Alternatively, the condition "when the first device has no sidelink data to at least the second device" may be represented, replaced, or interpreted as "when the first device has no available sidelink resource for delivering/transmitting the report (signaling) to at least the second device."

Alternatively, the first device may have an available sidelink data required to transmit to a third device different from the second device.

Alternatively, the report (signaling) does not belong to a logical channel. Alternatively, the report (signaling) may be a control signaling.

Alternatively, the report (signaling) may be a MAC control element. Alternatively, the report (signaling) may be a RRC message. Alternatively, the report (signaling) does not comprise RLC PDU. Alternatively, the report (signaling) does not include data from PDCP layer. Alternatively, the report (signaling) includes value(s) derived/indicated from physical layer. Alternatively, the report (signaling) may be generated when the corresponding value(s) derived from physical layer is acquired. Alternatively, the report (signaling) may be generated when the corresponding value(s) is delivered/indicated from physical layer to the corresponding layer of the report (signaling). Alternatively, the report (signaling) may be generated when the first device has an available sidelink resource for delivering/transmitting the triggered report (signaling). Alternatively, the report (signaling) may be assembled into a MAC PDU when the first device has an available sidelink resource for delivering/transmitting the triggered report (signaling).

Alternatively, the report (signaling) may be triggered when the first device receives a physical layer signaling with a corresponding report triggering. Alternatively, the physical layer signaling is transmitted from the second device. Alternatively, the report (signaling) may be triggered when the first device receives a triggering MAC control element with a corresponding report triggering. Alternatively, the triggering MAC control element is transmitted from the second device.

Alternatively, the selected sidelink resource may be with a single sub-channel (in the frequency domain).

Alternatively, if the first device has an available sidelink resource for performing a sidelink transmission to at least the second device, the first device may not select the sidelink resource based on the sensing for delivering the report (signaling). The first device may utilize the available sidelink resource for delivery/transmission of the report (signaling).

Alternatively, the first device could switch from (a simultaneously network scheduling mode or) a UE selection mode to a network scheduling mode after delivering/transmitting the report (signaling). Alternatively, the first device could switch from a network scheduling mode (only) to using (a simultaneously network scheduling mode and) a UE selection mode for transmitting the report (signaling).

According to another method, a first device receives a configuration for operating in a network scheduling mode for acquiring sidelink resource(s), the first device may select a sidelink resource from an exceptional pool and transmits a report (signaling) via the selected sidelink resource. More specifically, when the first device receives a configuration for operating in a network scheduling mode, the first device can select a sidelink resource from an exceptional pool for acquiring sidelink resources for delivering/transmitting a report (signaling).

In one embodiment, a first device receives a configuration for operating in a network scheduling mode for acquiring sidelink resource(s), wherein the sidelink resource(s) are utilized for sidelink communication with at least a second device. When the first device is required to deliver/transmit a report (signaling) to at least the second device, and when the first device has no sidelink data to at least the second device (for a specific time from the required delivery/transmission of the report (signaling), the first device may select a sidelink resource from an exceptional pool and utilize the selected sidelink resource for delivering/transmitting the report (signaling) to at least the second device. Alternatively, the first device may not utilize the selected sidelink resource from the exceptional pool for delivering/transmitting sidelink data to at least the second device.

Alternatively, the first device may have an available sidelink data required to transmit to a third device different from the second device.

Alternatively, the report (signaling) does not belong to a logical channel. Alternatively, the report (signaling) may be a control signaling.

Alternatively, the report (signaling) may be a MAC control element. Alternatively, the report (signaling) may be a RRC message. Alternatively, the report (signaling) does not include RLC PDU. Alternatively, the report (signaling) does not include data from PDCP layer. Alternatively, the report (signaling) includes value(s) derived/indicated from physical layer. Alternatively, the report (signaling) may be generated when the corresponding value(s) derived from the physical layer is acquired. Alternatively, the report (signaling) may be generated when the corresponding value(s) is delivered/indicated from the physical layer to the corresponding layer of the report (signaling). Alternatively, the report (signaling) may be generated when the first device has an available sidelink resource for delivering/transmitting the triggered report (signaling). Alternatively, the report (signaling) may be assembled into a MAC PDU when the first device has an available sidelink resource for delivering/transmitting the triggered report (signaling). Alternatively, the value(s) could be a CQI value, RI value, RSRP value, PHR value, or any combination thereof.

Alternatively, if the first device has an available sidelink resource for performing sidelink transmission to at least the second device, the first device may not select the sidelink resource from the exceptional pool for delivering/transmitting the report (signaling). The first device may utilize the available sidelink resource for delivering/transmitting the report (signaling).

Alternatively, the first device would randomly select the sidelink resource from the exceptional pool.

Alternatively, the first device could receive a configuration of the exceptional pool by a base station (e.g., a network).

Alternatively, the first device could be indicated and/or configured with the exceptional pool via a system information (by the base station).

Alternatively, the exceptional pool could indicate and/or provide sidelink resource(s) by which the first device transmits sidelink data and/or the report (signaling) in the exceptional conditions. The exceptional conditions could contain the case where the report (signaling) (e.g., MAC CE) becomes available for SL transmission, and the first device does not have SL resources available for the SL transmission.

According to another method, a report (signaling) can belong to or be associated with a (virtual) sidelink logical channel. Alternatively, the (virtual) sidelink logical channel may be (pre-)configured and/or assigned with a priority. More specifically, the (virtual) sidelink logical channel may be able to trigger a sidelink buffer status report and/or a scheduling request to the network.

In one embodiment, a first device may receive a configuration for operating in a network scheduling mode for acquiring sidelink resource(s), wherein the sidelink resource(s) are utilized for a sidelink communication with at least a second device. When the first device has an available report (signaling) in the (virtual) sidelink logical channel to at least the second device, and when the first device has no sidelink data to send to at least the second device (for a specific time from the required delivery/transmission of the report (signaling), the first device may trigger a sidelink buffer status report and/or a scheduling request to network. Alternatively, the triggered sidelink buffer status report may indicate a buffer size of the (virtual) sidelink logical channel. When the network receives the sidelink buffer status report and/or receives and/or detects the scheduling request, the network may schedule sidelink resource(s) to the first device. The first device may utilize the sidelink resource(s) for delivering/transmitting the report (signaling) to at least the second device.

Alternatively, the first device may have available sidelink data required to transmit to a third device different from the second device.

Alternatively, the report (signaling) may be a control signaling.

Alternatively, the report (signaling) may be a MAC control element. Alternatively, the report (signaling) may be a RRC message. Alternatively, the report (signaling) does not include RLC PDU. Alternatively, the report (signaling) does not include data from the PDCP layer. Alternatively, the report (signaling) includes value(s) derived/indicated from the physical layer. Alternatively, the report (signaling) may be generated when the corresponding value(s) derived/indicated from the physical layer is acquired. Alternatively, the report (signaling) may be generated when the corresponding value(s) is delivered/indicated from the physical layer to the corresponding layer of the report (signaling). Alternatively, the report (signaling) may be generated when the first device has an available sidelink resource for delivering/transmitting the triggered report (signaling). Alternatively, the report (signaling) may be assembled into a MAC PDU when the first device has available sidelink resource for delivering/transmitting the triggered report (signaling). Alternatively, the value(s) could be a CQI value, RI value, RSRP value, PHR value or any combination thereof. Alternatively, the (virtual) sidelink logical channel does not include RLC PDU. Alternatively, the (virtual) sidelink logical channel does not include data from the PDCP layer.

Alternatively, the (virtual) sidelink logical channel may be a sidelink logical channel to (or associated with) at least the second device. The (virtual) sidelink logical channel could be a sidelink logical channel associated with a destination (identity). The destination (identity) could be associated with at least the second device.

Alternatively, the (virtual) sidelink logical channel may be a (pre-)configured and/or a specific sidelink logical channel to be (or is associated with) at least the second device. Alternatively, the (virtual) sidelink logical channel may be a sidelink logical channel with the lowest or highest index to be (or is associated with) at least the second device.

Alternatively, the sidelink buffer status report may indicate the sidelink buffer status of at least the (virtual) sidelink logical channel. Alternatively, the sidelink buffer status report may indicate the sidelink buffer(s) associated with at least the (virtual) sidelink logical channel. Alternatively, the sidelink buffer status (only) considers the sidelink buffer(s) (associated with the sidelink logical channel(s)) from the first device to at least the second device. Alternatively, the sidelink buffer status (only) considers the sidelink buffer(s) (associated with the sidelink logical channel(s)) belonging to the connection and/or link between the first device and at least the second device.

Alternatively, when the first device does not have any uplink resources to deliver/transmit the sidelink buffer status report, the sidelink buffer status report may trigger a (sidelink) scheduling request from the first device to the network. When the network receives and/or detects the (sidelink) scheduling request from the first device, the network may schedule an uplink resource to the first device, and the first device may utilize the uplink resource to deliver/transmit the sidelink buffer status report to the network.

Alternatively, when the first device has an available uplink resource to deliver/transmit the sidelink buffer status report, the first device delivers/transmits the sidelink buffer status report via the uplink resource.

Alternatively, if the first device has an available sidelink resource for performing a sidelink transmission to at least the second device, the first device may not trigger the sidelink buffer status report to the network. The first device may utilize the available sidelink resource to deliver/transmit the report (signaling).

According to another method, when a first device receives and/or detects a report triggering from a second device, the first device may be triggered to deliver/transmit a report (signaling) to a second device. With the corresponding report triggering, the second device may deliver/transmit a resource grant to the first device. The first device may utilize the sidelink resource(s) based on the resource grant for delivering/transmitting the report (signaling) to the second device. Alternatively, the resource grant is (dedicated) for the first device to transmit the report (signaling). Alternatively, among the sidelink resource(s), each resource is a single sub-channel (in a frequency domain). Alternatively, the motivation of multiple sidelink resource(s) indicated by the resource grant is to relieve the half-duplex issue in the first device.

Alternatively, the report (signaling) does not belong to a logical channel. Alternatively, the report (signaling) may be a control signaling.

Alternatively, the report (signaling) may be a MAC control element. Alternatively, the report (signaling) may be a RRC message. Alternatively, the report (signaling) does not include a RLC PDU. Alternatively, the report (signaling) does not include data from the PDCP layer. Alternatively, the report (signaling) includes value(s) derived/indicated from the physical layer. Alternatively, the report (signaling) may be generated when the corresponding value(s) derived from the physical layer is acquired. Alternatively, the report (signaling) may be generated when the corresponding value(s) is delivered/indicated from the physical layer to the corresponding layer of the report (signaling). Alternatively, the report (signaling) may be generated when the first device has an available sidelink resource to deliver/transmit the triggered report (signaling). Alternatively, the report (signaling) may be assembled into a MAC PDU when the first device has an available sidelink resource to deliver/transmit the triggered report (signaling). Alternatively, the value(s) could be a CQI value, RI value, RSRP value, PHR value, or any combination thereof.

Alternatively, the report (signaling) may be triggered when the first device receives a physical layer signaling with a corresponding report triggering. Alternatively, the physical layer signaling is transmitted from the second device. The physical layer signaling may schedule a sidelink transmission from the second device to the first device, wherein the sidelink transmission delivers and/or includes the resource grant to the first device.

Alternatively, the report (signaling) may be triggered when the first device receives a triggering MAC control element with a corresponding report triggering. Alternatively, the triggering MAC control element is transmitted from the second device. Alternatively, the triggering MAC control element may include the resource grant to the first device. Alternatively, the triggering MAC control element and the resource grant are included in the same transport block or the same MAC PDU.

Alternatively, each of the sidelink resource(s) based on the resource grant may be with a single sub-channel (in a frequency domain).

Alternatively, the sidelink transmission(s) on the sidelink resources based on the resource grant may not support and/or enable a sidelink HARQ feedback.

Alternatively, the sidelink resource(s) based on the resource grant may be acquired from some and/or part of the sidelink resources scheduled from the network to the second device. Alternatively, the sidelink resource(s) based on the resource grant may be selected by the second device.

Alternatively, the first device may utilize the sidelink resource(s) based on the resource grant for delivering/transmitting the report (signaling) and/or sidelink data to the second device. Alternatively, the first device may not utilize the sidelink resource(s) based on the resource grant for delivering/transmitting (only) sidelink data to the second device.

Alternatively, if the first device has an available sidelink resource for performing a sidelink transmission to at least the second device, the first device may not utilize the sidelink resource(s) based on the resource grant. The first device may utilize the available sidelink resource for delivering/transmitting the report (signaling).

According to another method, when a first device receives/detects a first report triggering from a second device, the first device may trigger or be triggered to deliver/transmit a first report (signaling) to a second device. If the first device has no available sidelink resources for delivering/transmitting the first report (signaling) (for a duration time), the second device may transmit a second report triggering to trigger a second report (signaling) from the first device. Alternatively, the first report (signaling) delivers/transmits the same type of report with the second report (signaling). Alternatively, the same type of report means the first report (signaling) delivers/transmits the same content as the second report (signaling). For example, both the first report (signaling) and the second report (signaling)

deliver/transmit a SL CSI report (for the connection and/or link between the first device and the second device).

In this case, the first report (signaling) may be out-of-date and meaningless. Thus, when the first device receives and/or detects the second report triggering or when the first device generates the second report (signaling), and if the first device has not yet transmitted the first report (signaling), the first device may cancel or discard the first report (signaling). Alternatively, when the first device receives and/or detects the second report triggering or when the first device generates the second report (signaling), and if the first device has not yet assembled the first report (signaling) into a MAC PDU, the first device may cancel or discard the first report (signaling). Alternatively, when the first device receives and/or detects the second report triggering or when the first device generates the second report (signaling), the first device may cancel or discard the pending report (signaling) with the same type report with the second report (signaling).

Alternatively, when the first device generates the first report (signaling) and the first device has not yet transmitted the first report (signaling) for a duration time, the first device may cancel or discard the first report (signaling). Alternatively, when the first device generates the first report (signaling) and the first device has not yet assembled the first report (signaling) into a MAC PDU for a duration time, the first device may cancel or discard the first report (signaling).

Alternatively, after receiving and/or detecting the second report triggering, if the first device has an available sidelink resource for performing a sidelink transmission to at least the second device, the first device may utilize the available sidelink resource for delivering/transmitting the second report (signaling). Alternatively, the first device may not utilize the available sidelink resource for delivering/transmitting the first report (signaling).

Alternatively, after the duration time, if the first device has an available sidelink resource for performing a sidelink transmission to at least the second device, the first device may not utilize the available sidelink resource for delivering/transmitting the first report (signaling).

Alternatively, the first and/or second report (signaling) does not belong to a logical channel. Alternatively, the first and/or second report (signaling) may be a control signaling. Alternatively, the first and/or second report (signaling) may be a MAC control element. Alternatively, the first and/or second report (signaling) may be a RRC message. Alternatively, the first and/or second report (signaling) does not include a RLC PDU. Alternatively, the first and/or second report (signaling) does not include data from the PDCP layer. Alternatively, the first and/or second report (signaling) may include corresponding value(s) derived/indicated from the physical layer. Alternatively, the first and/or second report (signaling) may be generated when the corresponding value(s) derived from the physical layer is acquired. Alternatively, the first and/or second report (signaling) may be generated when the corresponding value(s) is delivered/indicated from the physical layer to the corresponding layer of the report (signaling). Alternatively, the corresponding value(s) could be a CQI value, R1 value, RSRP value, PHR value or any combination thereof.

Alternatively, the first and/or second report triggering may be delivered/transmitted via physical layer signaling. Alternatively, the physical layer signaling is transmitted from the second device. Alternatively, the first and/or second report triggering may trigger a MAC control element. Alternatively, the triggering MAC control element is transmitted from the second device.

Alternatively, the duration time may be (pre-)configured or specified for the connection and/or link between the first device and the second device.

Alternatively, the duration time may be (pre-)configured or specified for the second device. Alternatively, the duration time (pre-)configured or specified in the second device may be utilized for re-triggering the report (signaling). Alternatively, the duration time (re)starts when the second device transmits the first report triggering at the first time.

Alternatively, the duration time may be (pre-)configured or specified for the first device. Alternatively, the duration time (pre-)configured or specified in the first device may be utilized for canceling or discarding not yet transmitted and/or assembled report (signaling). Alternatively, the duration time (re)starts when the first device receives and/or detects the first report triggering at the first time.

Alternatively, the duration time (pre-)configured or specified for the second device may be the same as or different from the duration time (pre-)configured or specified for the first device. Alternatively, for the connection and/or link between a transmitting device and a receiving device, the duration time (pre-)configured or specified for a receiving device may be the same as or different from the duration time (pre-)configured or specified for a transmitting device.

Alternatively, the second device considers the first report (signaling) as available if the second device receives the first report (signaling) during the duration time.

Alternatively, the second device considers the first report (signaling) as available if the second device receives the first report (signaling) outdated and/or after the duration time.

Alternatively, the second device drops the first report (signaling) if the second device receives the first report (signaling) outdated and/or after the duration time. Alternatively, the second device does not perform link adaption (e.g., adjust any of the MCS, R1, SL pathloss, or transmit power) based on the first report (signaling) if the second device receives the first report (signaling) outdated and/or after the duration time. Alternatively, this situation may happen due to the first report (signaling) is transmitted at the margin of the duration time. Alternatively, considering a transmission delay (e.g., one side delay or round trip delay), the second device would receive the first report (signaling) outdated and/or after the duration time. Alternatively, in one case, the first report (signaling) is a SL CSI report.

Alternatively, if the first report (signaling) is different from the SL CSI report, the second device may not drop the first report (signaling) (even) if received outdated and/or after the duration time.

Alternatively, the time duration is in the unit of the slot belonging to a (RX) sidelink resource pool.

Alternatively, the time duration is in the unit of the slot which may or may not contain a sidelink resource.

Alternatively, the time duration is in the unit of a millisecond.

Alternatively, the time duration is the time which the first device or the second device considers the first report (signaling) is meaningful or available.

Alternatively, the second report (signaling) is triggered later than the first report (signaling). Alternatively, the second report (signaling) is generated later than the first report (signaling).

Alternatively, the first device measures a first reference signal corresponding to a first sidelink transmission and derives a first value included in the first report (signaling). Alternatively, the first reference signal is transmitted or received in the same first sidelink slot with the corresponding first sidelink transmission. The first device measures a second reference signal corresponding to a second sidelink transmission and derives a second value included in the second report (signaling). Alternatively, the second reference signal is transmitted or received in the same second sidelink slot with the corresponding second sidelink transmission. Alternatively, the second sidelink transmission is transmitted or received later than the first sidelink transmission. Alternatively, the first sidelink transmission and the second sidelink transmission include different transport blocks or different MAC PDUs. Alternatively, the second reference signal is transmitted or received later than the first reference signal. Alternatively, the second reference signal and the first reference signal are the same type of sidelink reference signal. Alternatively, the second reference signal and the first reference signal are associated with the same (RX) spatial relation. Alternatively, the second reference signal is a SL CSI-RS, and the first reference signal is a SL CSI-RS. Alternatively, the second reference signal is a SL DMRS, and the first reference signal is a SL DMRS.

In the various embodiments, the time duration is referred to, starts from, counts from a slot and/or resource delivering/transmitting the first sidelink transmission or triggering the first device to transmit the first report (signaling). Alternatively, the time duration is referred to, starts from, counts from beginning of a slot boundary or the beginning of the first sidelink transmission.

According to another method, a second device may transmit a report triggering multiple times, wherein the report triggering is utilized for triggering/transmitting a report (signaling) from a first device. The second device may stop transmitting the report triggering when the second device receives the corresponding report (signaling). Alternatively, when the second device transmits the report triggering, the second device may keep or not cancel and/or discard the report triggering. When the second device receives the corresponding report (signaling), the second device may cancel or discard or complete the report triggering.

In other words, when and/or after the second device determines to deliver/transmit a report triggering to the first device, the second device can keep delivery/transmission of the report triggering in each following the physical layer signaling to the first device until the second device receives the report (signaling) from the first device. Alternatively, when and/or after the second device determines to deliver/transmit a report triggering to the first device, the second device can keep delivery/transmission of the report triggering in each following sidelink transmission to the first device until the second device receives the report (signaling) from the first device.

Since the second device can transmit a reference signal, for assisting the first device in measurement, (only) when the second device transmits the report triggering via corresponding physical layer signaling or via corresponding sidelink transmission including a triggering MAC control element. The second device can transmit the reference signal multiple times when the second device transmits the report triggering multiple times. It can help the first device to derive a most recent/newest/averaged measurement result to be included in the report (signaling), when the first device has an available sidelink resource to deliver/transmit the triggered report (signaling). This can help to solve some scenarios in which the first device does not receive the report triggering. For instance, it can relieve half-duplex issue in the first device.

The first device may receive multiple physical layer signals from the second device, wherein each of the multiple physical layer signals delivers/transmits report triggering. Alternatively, the first device may receive multiple triggering MAC control elements from the second device, wherein each of the multiple triggering MAC control elements delivers/transmits report triggering. In other words, the first device may receive/detect report triggering multiple times, wherein the report triggering triggers a report (signaling) to the second device. When the first device has an available sidelink resource (to the second device), the first device may deliver/transmit one triggered report (signaling).

If the first device has no sidelink data to send to the second device or has no available sidelink resource (to the second device), the multiple report triggering from the second device may be pending.

Alternatively, when the first device generates the one report (signaling) to the second device, the first device may cancel or discard the multiple report triggerings from the second device. Alternatively, when the first device assembles a report (signaling) into a MAC PDU to the second device, the first device may cancel or discard the multiple report triggerings from the second device. Alternatively, when the first device transmits a report (signaling) to the second device, the first device may cancel or discard the multiple report triggerings from the second device. Alternatively, when the first device acquires SL HARQ feedback as ACK for a sidelink transmission that includes the report (signaling) to the second device, the first device may cancel or discard the multiple report triggerings from the second device.

Alternatively, the report (signaling) does not belong to a logical channel. Alternatively, the report (signaling) may be control signaling.

Alternatively, the report (signaling) may be MAC control element. Alternatively, the report (signaling) may be a RRC message. Alternatively, the report (signaling) does not include a RLC PDU. Alternatively, the report (signaling) does not include data from the PDCP layer. Alternatively, the report (signaling) may include corresponding value(s) derived/indicated from the physical layer. Alternatively, the report (signaling) may be generated when the corresponding value(s) derived from the physical layer is acquired. Alternatively, the report (signaling) may be generated when the corresponding value(s) is delivered/indicated from the physical layer to the corresponding layer of the report (signaling). Alternatively, the report (signaling) may be generated when the first device has an available sidelink resource to deliver/transmit the triggered report (signaling). Alternatively, the report (signaling) may be assembled into a MAC PDU when the first device has an available sidelink resource to deliver/transmit the triggered report (signaling). Alternatively, the corresponding value(s) could be a CQI value, RI value, RSRP value, PHR value, or any combination thereof.

Alternatively, the report triggering may be delivered/transmitted via physical layer signaling. Alternatively, the physical layer signaling is transmitted from the second device. Alternatively, the report triggering may be triggering a MAC control element. Alternatively, the triggering MAC control element is transmitted from the second device.

As those skilled in the art will appreciate, the above-disclosed methods, embodiments, and alternatives may be combined or applied simultaneously.

In some embodiments, the report (signaling) is a signaling for delivering sidelink measurement report. In some embodiments, the report (signaling) is a signaling for delivering sidelink control information.

In some embodiments, the report signaling is a signaling for delivering/transmitting sidelink channel state information (SL CSI) report. In some embodiments, the SL CSI may include any of SL Channel Quality Indicator (CQI), SL RI, and/or SL PMI. Alternatively, the SL CSI is derived from the measurement performed in the physical layer. In some embodiments, the SL CSI is derived from SL CSI-RS measurement. Alternatively, the SL CSI is derived from the SL DMRS measurement.

In some embodiments, the report signaling is a signaling for delivering/transmitting sidelink power information report. In some embodiments, the sidelink power information may include any of (L3-filtered) SL Reference Signal Received Power (RSRP), SL Reference Signal Received Quality (RSRQ), SL Received Signal Strength Indicator (RSSI), SL pathloss, SL transmit power, SL compensation power value, SL power adjustment state, and/or SL PHR. Alternatively, the sidelink power information is derived from the measurement performed in the physical layer. Alternatively, the sidelink power information CSI is derived from the SL CSI-RS measurement. Alternatively, the sidelink power information is derived from the SL Demodulation Reference Signal (DMRS) measurement.

In some embodiments, the sidelink data is associated with at least a sidelink logical channel. Alternatively, the sidelink data comes from at least a sidelink logical channel. Alternatively, the report (signaling) may not be regarded and/or considered as sidelink data.

In some embodiments, the sidelink transmission may be a Physical Sidelink Shared Channel (PSSCH). Alternatively, the sidelink transmission may be a Physical Sidelink Control Channel (PSCCH).

In some embodiments, the physical layer signalling may be sidelink control information. Alternatively, the physical layer signalling may be a first stage sidelink control information (SCI). Alternatively, the physical layer signalling may be second stage SCI.

In some embodiments, a field in the physical layer signaling indicates whether the report triggering is delivered/transmitted/indicated or not. Alternatively, the field may be a SL CSI report request or SL CSI-RS presence. For instance, the field indicating a SL CSI report is requested or indicating SL CSI-RS is present means/implies that the report triggering is delivered. The field indicating SL CSI report is not requested or indicating SL CSI-RS is not present means/implies that the report triggering is not delivered. For instance, the field indicating SL CSI report is requested or indicating SL CSI-RS is present means/implies report (signaling) is triggered. The field indicating SL CSI report is not requested or indicating SL CSI-RS is not present means/implies that the report (signaling) is not triggered.

In some embodiments, the sidelink connection/link between the first device and the second device may be a unicast connection/link. Alternatively, the sidelink transmission may be a unicast transmission. Alternatively, the reference signal transmission may be a unicast transmission.

In some embodiments, the sidelink connection/link between the first device and at least the second device may be a groupcast connection/link. Alternatively, the sidelink transmission may be a groupcast transmission. Alternatively, the reference signal transmission may be a groupcast transmission.

In some embodiments, the specific time may be (pre-)configured/specified. Alternatively, the specific time may be associated with the report (signaling). Alternatively, the specific time may be associated with the (virtual) sidelink logical channel. Alternatively, the specific time is shorter than the duration time.

In some embodiments, the slot may mean that the sidelink slot or the slot for sidelink. Alternatively, a slot may be represented as a transmission time interval (TTI). Alternatively, a TTI may be a subframe (for a sidelink). Alternatively, a TTI includes multiple symbols, e.g., 12 or 14 symbols. Alternatively, the TTI may be a slot (fully/partially) including sidelink symbols. Alternatively, the TTI may mean a transmission time interval for a sidelink (data) transmission. Alternatively, a sidelink slot or a slot for sidelink may contain all the OFDM symbols available for the sidelink transmission. Alternatively, a sidelink slot or a slot for sidelink may contain consecutive number symbols available for the sidelink transmission. Alternatively, a sidelink slot or a slot for sidelink means that a slot is included in a sidelink resource pool.

In some embodiments, the symbol may mean a symbol indicated and/or configured for a sidelink.

In some embodiments, a sub-channel is a unit for a sidelink resource allocation and/or scheduling (for PSSCH). Alternatively, a sub-channel may include multiple contagious Physical Resource Blocks (PRBs) in a frequency domain. Alternatively, the number of PRBs for each sub-channel may be (pre-)configured for a sidelink resource pool. Alternatively, a sidelink resource pool (pre-)configuration may indicate/configure the number of PRBs for each sub-channel. Alternatively, the number of PRBs for each sub-channel may be any of 4, 5, 6, 8, 9, 10, 12, 15, 16, 18, 20, 25, 30, 48, 50, 72, 75, 96, or 100. Alternatively, a sub-channel may be represented as a unit for a sidelink resource allocation and/or scheduling. Alternatively, a sub-channel may mean a PRB. Alternatively, a sub-channel may mean a set of consecutive PRBs in a frequency domain. Alternatively, a sub-channel may mean a set of consecutive resource elements in a frequency domain.

In some embodiments, the SL HARQ feedback may include ACK or NACK. Alternatively, the SL HARQ feedback for a data packet may be derived and/or based on whether the receiving device successfully receives and/or decodes the data packet delivered in the associated sidelink (re)transmission.

In some embodiments, a data packet may mean a Transport Block (TB). Alternatively, a data packet may mean a MAC PDU. Alternatively, a data packet may mean one or two TB(s) delivered and/or included in one sidelink (re) transmission.

Alternatively, the sidelink transmission and/or reception may be device-to-device transmission and/or reception. Alternatively, the sidelink transmission and/or reception may be V2X transmission and/or reception. Alternatively, the sidelink transmission and/or reception may be a Pedestrian-to-Everything (P2X) transmission and/or reception. Alternatively, the sidelink transmission and/or reception may be on PC5 interface.

In some embodiments, the PC5 interface may be a wireless interface for communications between device and device. Alternatively, the PC5 interface may be a wireless interface for communications between devices. Alternatively, the PC5 interface may be a wireless interface for communication between UEs. Alternatively, the PC5 interface may be a wireless interface for V2X or P2X communications. Alternatively, the Uu interface may be a wireless interface for communications between a network node and a device. Alternatively, the Uu interface may be a wireless interface for communications between a network node and a UE.

In some embodiments, the first device and the second device are different devices. Alternatively, the first device may be a UE. Alternatively, the first device may be a vehicle UE. Alternatively, the first device may be a V2X UE.

In some embodiments, the second device may be a UE. Alternatively, the second device may be a vehicle UE. Alternatively, the second device may be a V2X UE.

Figure 14:
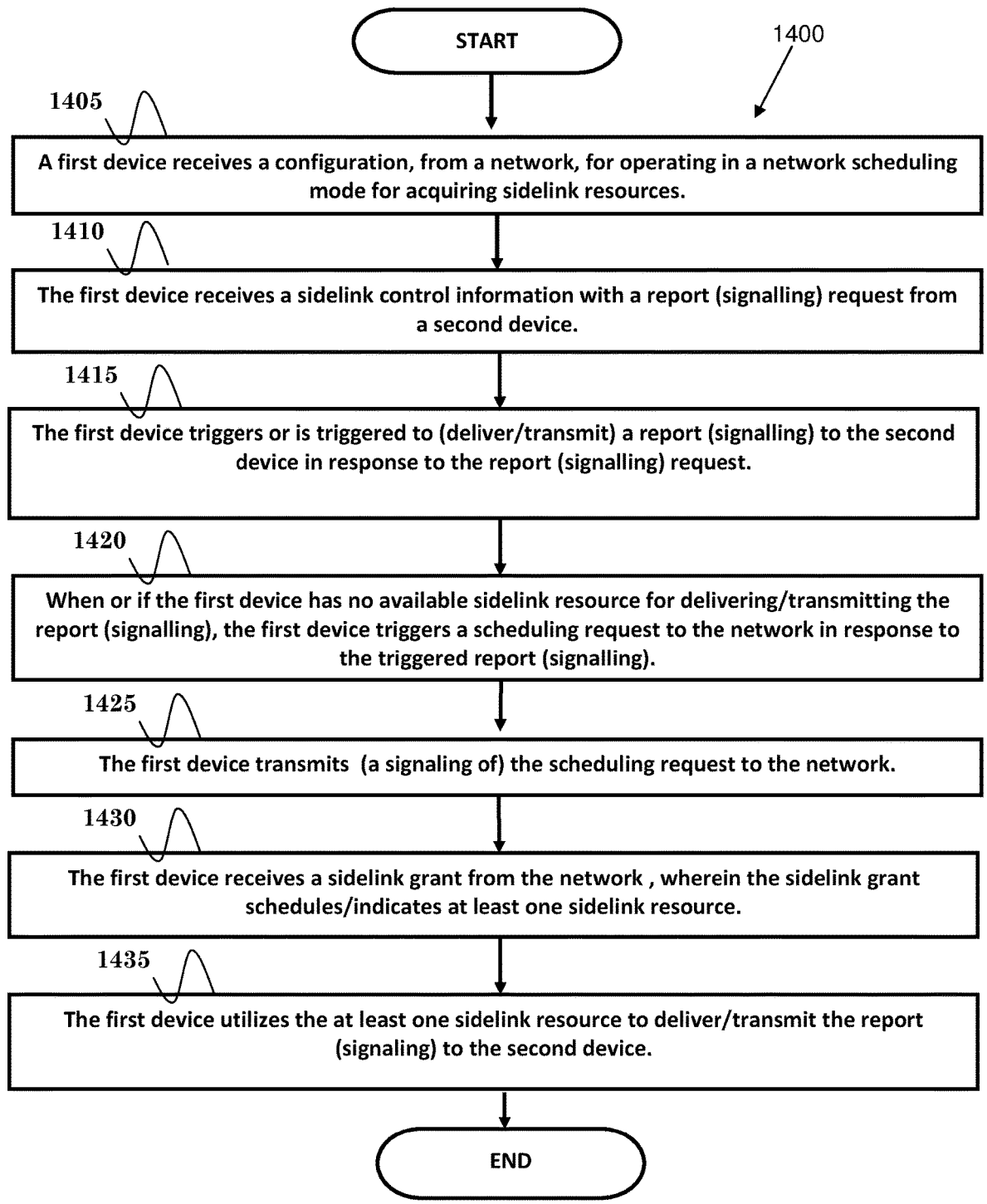
FIG. 14 is a flow diagram for one exemplary embodiment.

FIG. 14 is a flow chart 1400 according to one exemplary method from the perspective of a first device such as, but not limited to, a UE. In step 1405, a first device receives a configuration, from a network, for operating in a network scheduling mode for acquiring sidelink resources. In step 1410, the first device receives a sidelink control information with a report (signaling) request from a second device. In step 1415, the first device triggers or is triggered (to deliver/transmit) a report (signaling) to the second device in response to the report (signaling) request. In step 1420, when or if the first device has no available sidelink resource for delivering/transmitting the report (signaling), the first device triggers a scheduling request (to the network in response to the triggered report (signaling)). In step 1425, the first device transmits (a signaling of) the scheduling request to the network. In step 1430, the first device receives a sidelink grant from the network, wherein the sidelink grant schedules/indicates at least one sidelink resource. In step 1435, the first device utilizes the at least one sidelink resource to deliver/transmit the report (signaling) to the second device.

In one embodiment, the first device receives the sidelink grant from the network, after transmitting (the signaling of) the scheduling request. In one embodiment, the first device transmits (the signaling of) the scheduling request, before receiving the sidelink grant from the network.

In one embodiment, the report (signaling) does not trigger a sidelink buffer status report to the network.

In one embodiment, the first device transmits (the signaling of) the scheduling request to the network, even when the first device has an available uplink resource for performing a Physical Uplink Shared Channel (PUSCH) transmission.

In one embodiment, the first device receives a configuration, from the network, with one scheduling request configuration for transmitting the scheduling request. The first device transmits (the signaling of) the scheduling request, to the network, based on the one scheduling request configuration associated with the report (signaling).

In one embodiment, the triggered report (signaling) is assembled into a MAC PDU when the first device has an available sidelink resource for delivering/transmitting the triggered report (signaling). In one embodiment, the report (signaling) comprises values derived/indicated from a physical layer. In one embodiment, the report is SL CSI report.

In one embodiment, the first device cancels or discards the report (signaling) if the first device has not yet transmitted the report (signaling) within a duration time, or if the first device does not yet assemble the report (signaling) into a MAC PDU within a duration time.

In one embodiment, the duration time is preconfigured, configured or specified in the first device, and the duration time is utilized for cancelling or discarding not yet transmitted or assembled the report (signaling). The duration time restarts or starts counting when the first device receives or detects the report triggering, or receives or detects the sidelink control information with the report (signaling) request from the second device.

Figure 15:
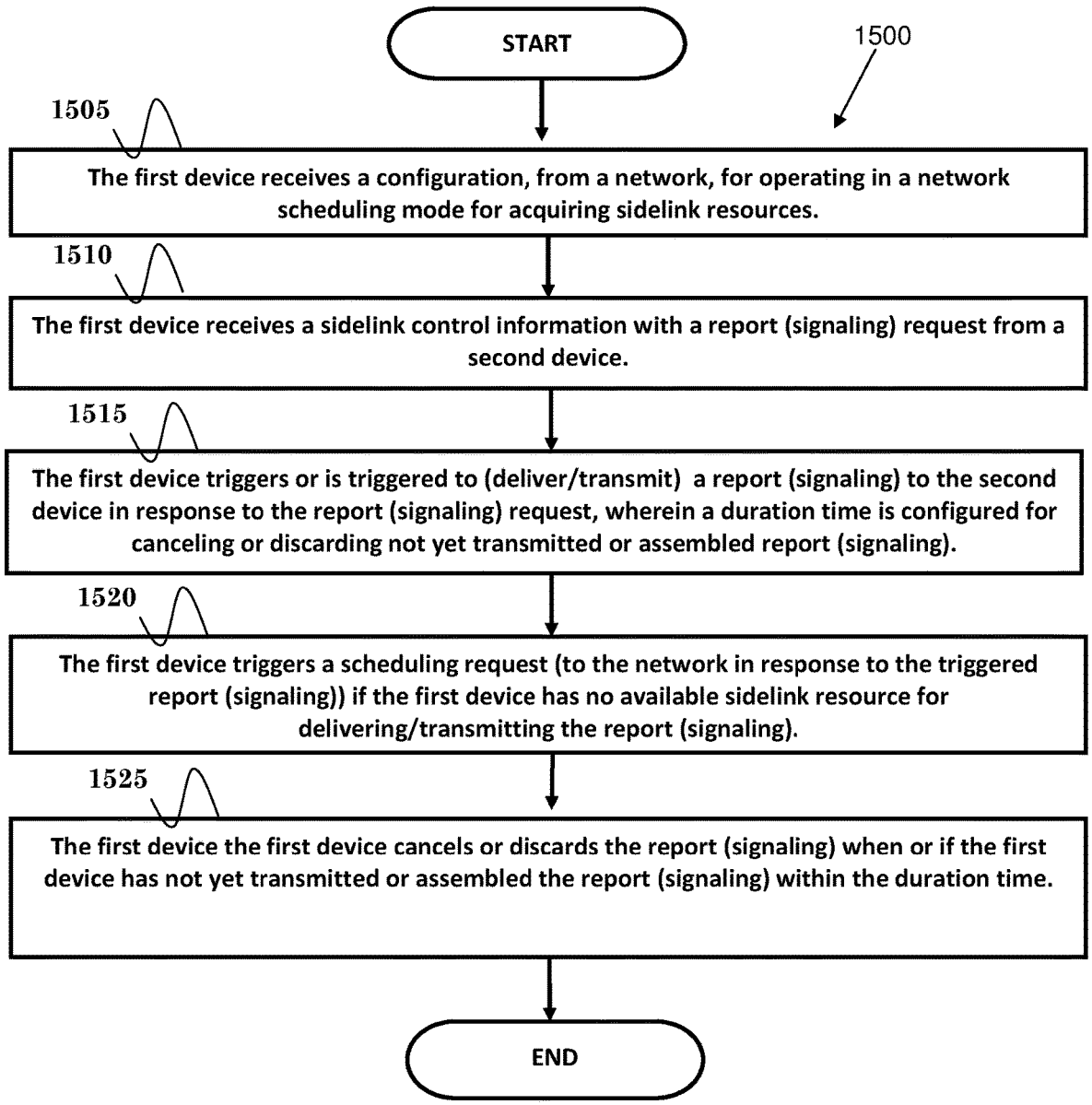
FIG. 15 is a flow diagram for one exemplary embodiment.

FIG. 15 is a flow chart 1500 according to one exemplary method from the perspective of a first device such as, but not limited to, a UE. In step 1505, the first device receives a configuration, from a network, for operating in a network scheduling mode for acquiring sidelink resources. In step 1510, the first device receives a sidelink control information with a report (signaling) request from a second device. In step 1515, the first device triggers or is triggered (to deliver/transmit) a report (signaling) to the second device in response to the report (signaling) request, wherein a duration time is configured for canceling or discarding not yet transmitted or assembled report (signaling). In step 1520, the first device triggers a scheduling request (to the network in response to the triggered report (signaling) when or if the first device has no available sidelink resource for delivering/transmitting the report (signaling). In step 1525, the first device cancels or discards the report (signaling) if the first device has not yet transmitted or assembled the report (signaling) within the duration time.

In one embodiment, the first device receives a sidelink grant from the network after transmitting (a signaling of) the scheduling request. In one embodiment, the first device transmits (a signaling of) the scheduling request, before receiving a sidelink grant from the network. If a sidelink resource scheduled/indicated by the sidelink grant is within the duration time, the first device utilizes the sidelink resource to deliver/transmit the report (signaling) to the second device. If the sidelink resource based on the sidelink grant is after the duration time, the first device does not utilize the sidelink resource to deliver/transmit the report (signaling) to the second device.

In one embodiment, the duration time restarts or starts counting when the first device receives or detects the report triggering, or receives or detects the sidelink control information with the report (signaling) request from the second device.

In one embodiment, the first device transmits (the signaling of) the scheduling request to the network, even when the first device has an available uplink resource for performing a Physical Uplink Shared Channel (PUSCH) transmission.

In one embodiment, the first device receives a configuration, from the network, with one scheduling request configuration for transmitting the scheduling request. The first device transmits (the signaling of) the scheduling request, to the network, based on the one scheduling request configuration associated with the report (signaling).

In one embodiment, the report (signaling) is assembled into a Medium Access Control (MAC) Protocol Data Unit (PDU) when the first device has an available sidelink resource for delivering/transmitting the triggered report (signaling) within the duration time.

In one embodiment, the report (signaling) comprises values derived/indicated from the physical layer. In one embodiment, the report is SL CSI report. In one embodiment, the report (signaling) does not trigger a sidelink buffer status report to the network.

Figure 16:
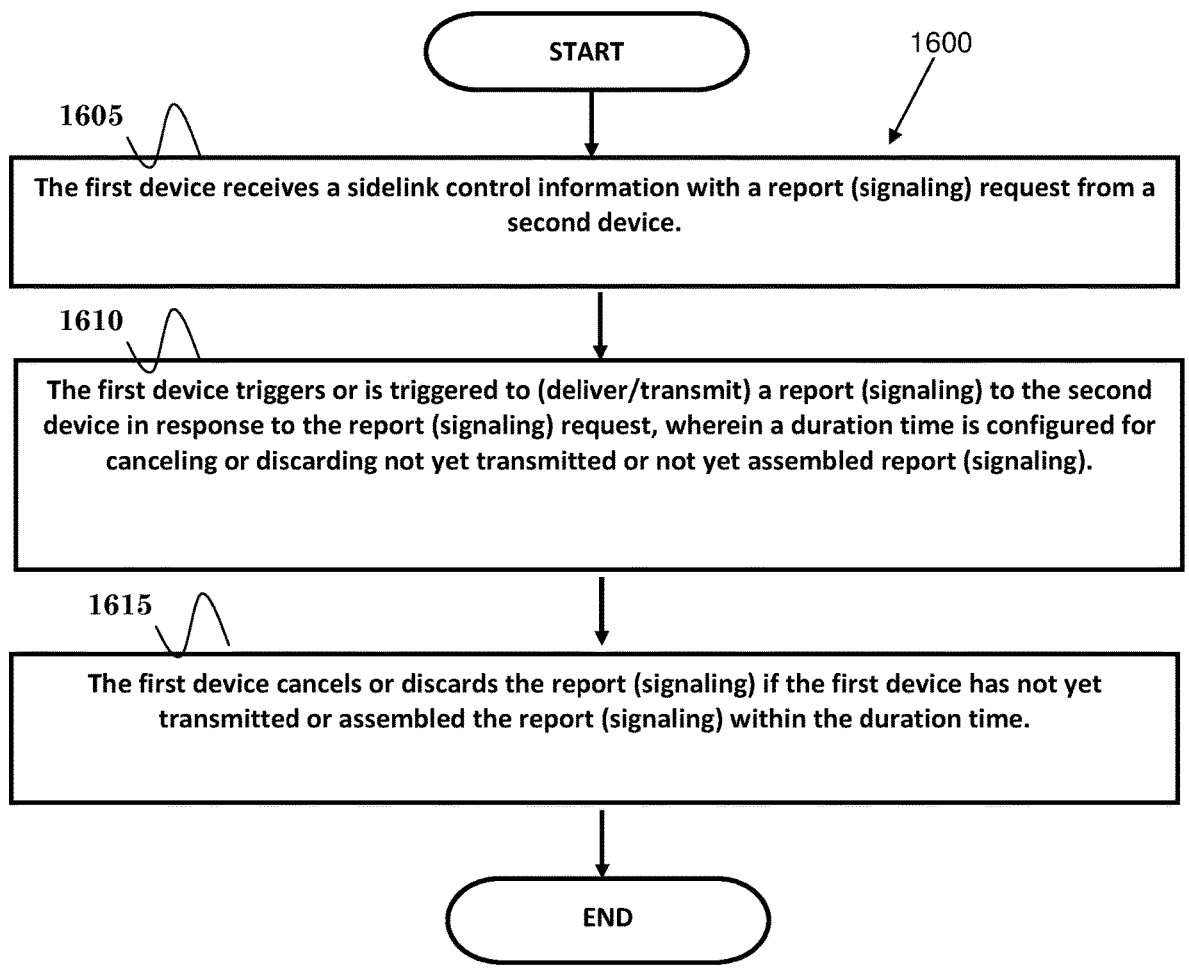
FIG. 16 is a flow diagram for one exemplary embodiment.

FIG. 16 is a flow chart 1600 according to one exemplary method from the perspective of a first device such as, but not limited to, a UE. In step 1605, the first device receives a sidelink control information with a report (signaling) request from a second device. In step 1610, the first device triggers or is triggered (to deliver/transmit) a report (signaling) to the second device in response to the report (signaling) request, wherein a duration time is configured for canceling or discarding not yet transmitted or not yet assembled report (signaling). In step 1615, the first device cancels or discards the report (signaling) if the first device has not yet transmitted or assembled the report (signaling) within the duration time.

In one embodiment, the first device acquires a sidelink resource. The first device uses the sidelink resource to deliver/transmit the report (signaling) to the second device if the sidelink resource is within the duration time. If the sidelink resource is after the duration time, the first device does not utilize sidelink resource to deliver/transmit the report (signaling) to the second device.

In one embodiment, the duration time restarts or starts counting when the first device receives or detects the report triggering, or receives or detects the sidelink control information with the report (signaling) request from the second device.

In one embodiment, the first device acquires the sidelink resource via a resource selection based on a sensing result, or wherein the first device acquires the sidelink resource via receiving a sidelink grant from the network.

In one embodiment, when the first device has no available sidelink resource for delivering/transmitting the report (signaling), the first device triggers a scheduling request (to the network in response to the triggered report (signaling)). The first device transmits (a signaling of) the scheduling request to the network.

In one embodiment, the first device transmits (the signaling of) the scheduling request to the network, even when the first device has an available uplink resource for performing a Physical Uplink Shared Channel (PUSCH) transmission.

In one embodiment, the first device receives a configuration, from the network, with one scheduling request configuration for transmitting the scheduling request. The first device transmits (the signalling of) the scheduling request, to the network, based on the one scheduling request configuration associated with the report (signaling).

As those skilled in the art will appreciate, the various disclosed embodiments and/or methods may be combined to form new embodiments and/or methods.

Referring back to FIGS. 3 and 4, in one embodiment, the device 300 includes a program code 312 stored in memory 310. The CPU 308 could execute program code 312 to (i) receive a configuration, from a network, for operating in a network scheduling mode for acquiring sidelink resources, (ii) receive by the first device a sidelink control information with a report (signaling) request from a second device, (iii) trigger or be triggered (to deliver/transmit) a report (signaling) to the second device in response to the report (signaling) request, (iv) when or if the first device has no available sidelink resource for delivering/transmitting the report (signaling), trigger a scheduling request (to the network in response to the triggered report (signaling)), (v) transmit (a signaling of) the scheduling request to the network by the first device, (vi) receive by the first device a sidelink grant from the network, wherein the sidelink grant schedules/indicates at least one sidelink resource, and (vii) utilize the at least one sidelink resource based on the sidelink grant to deliver/transmit the report (signaling) to the second device.

In another embodiment, the CPU 308 is could execute program code 312 to (i) receive a configuration, from a network, for operating in a network scheduling mode for acquiring sidelink resources, (ii) receive a sidelink control information with a report (signaling) request from a second device, (iii) trigger or is triggered (to deliver/transmit) a report (signaling) to the second device in response to the report (signaling) request, wherein a duration time is configured for canceling or discarding not yet transmitted or not yet assembled report (signaling), (iv) trigger a scheduling request (to the network in response to the triggered report (signaling)) when or if the first device has no available sidelink resource for delivering/transmitting the report (signaling), and (v) cancel or discard the report (signaling) if the first device has not yet transmitted or assembled the report (signaling) within the duration time.

In yet another embodiment, the CPU 308 is could execute program code 312 to (i) receive a sidelink control information with a report (signaling) request from a second device; (ii) trigger or is triggered (to deliver/transmit) a report (signaling) to the second device in response to the report (signaling) request, wherein a duration time is configured for canceling or discarding not yet transmitted or not yet assembled report (signaling), and (iii) cancel or discard the report (signaling) if the first device has not yet transmitted or assembled the report (signaling) within the duration time.

Furthermore, the CPU 308 can execute the program code 312 to perform all of the above-described actions and steps or others methods described herein.

The above-disclosed methods assist the UE in acquiring resource for reporting measurement result or some higher layer signaling.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first device to perform a sidelink communication, the method comprising:
receiving a configuration, from a network, for operating in a network scheduling mode for acquiring sidelink resources;
receiving a sidelink control information with a report request from a second device;
triggering or being triggered to transmit a report to the second device in response to the report request, wherein the report is sidelink (SL) channel state information (CSI) report, and the report comprises at least one of a Channel Quality Indicator, a Rank Indicator, or a Precoding Matrix Indicator; and
triggering, by the first device, a scheduling request in response to the SL CSI report for the second device or the report request from the second device when the first device has no available sidelink resource for transmitting the SL CSI report.

2. The method of claim 1, at least one of:
wherein the report is different from a sidelink buffer status report;
wherein the report does not trigger a sidelink buffer status report to the network; or
wherein the report is not taken into consideration when triggering or generating a sidelink buffer status report.

3. The method of claim 1, further comprising:
transmitting, by the first device, a signaling of the scheduling request to the network based on a scheduling request configuration associated with the SL CSI report for the second device;
receiving, by the first device, a sidelink grant from the network, wherein the sidelink grant indicates at least one sidelink resource; and
utilizing, by the first device, the at least one sidelink resource to transmit the SL CSI report to the second device.

4. The method of claim 1, at least one of:
wherein the report is assembled into a Medium Access Control (MAC) Protocol Data Unit (PDU) when the first device has an available sidelink resource for transmitting the report; or
wherein the report is included in a MAC Control Element (CE) and the MAC PDU comprises the MAC CE.

5. The method of claim 1,
wherein the first device triggers or generates a sidelink buffer status report for sidelink logical channels having sidelink data available for transmission; and
at least one of:
wherein the sidelink buffer status report does not indicate the need of transmitting the report; or
wherein the sidelink buffer status report is not triggered by the report.

6. The method of claim 1, wherein the scheduling request indicates the need of transmitting the report.

7. The method of claim 1, at least one of:
wherein the report comprises values at least one of derived or indicated from a physical layer;
wherein the report is derived from a SL CSI-RS measurement;
wherein the report is not or is not regarded as sidelink data; or
wherein the report does not belong to a logical channel or does not come from a logical channel.

8. A method for a first device to perform a sidelink communication, the method comprising:
receiving a configuration, from a network, for operating in a network scheduling mode for acquiring sidelink resources;
receiving, by the first device, a sidelink control information with a report request from a second device;
triggering or being triggered to transmit a report to the second device in response to the report request, wherein a duration time is configured for canceling or discarding not yet transmitted or assembled report, and wherein the report is sidelink (SL) channel state information (CSI) report and the report comprises at least one of a Channel Quality Indicator, a Rank Indicator, or a Precoding Matrix Indicator;

triggering, by the first device, a scheduling request in response to the SL CSI report for the second device or the report request from the second device if the first device has no available sidelink resource for transmitting the SL CSI report; and canceling or discarding the SL CSI report if the first device has not yet transmitted or assembled the SL CSI report within the duration time.

9. The method of claim 8, further comprising:
receiving, by the first device, a sidelink grant from the network after transmitting a signaling of the scheduling request, wherein the sidelink grant indicates at least one sidelink resource; and
if the at least one sidelink resource is within the duration time, utilizing, by the first device, the at least one sidelink resource to transmit the report to the second device,
wherein if the at least one sidelink resource is after the duration time, the first device does not utilize the at least one sidelink resource to transmit the report to the second device.

10. The method of claim 8, wherein the duration time restarts or starts counting when the first device receives or detects the report triggering, or receives or detects the sidelink control information with the report request from the second device.

11. The method of claim 8, at least one of:
wherein the report is different from a sidelink buffer status report;
wherein the report does not trigger a sidelink buffer status report to the network;
wherein the report is not taken into consideration when triggering or generating a sidelink buffer status report;
wherein the report comprises values at least one of derived or indicated from a physical layer;
wherein the report is derived from a SL CSI-RS measurement;
wherein the report is not or is not regarded as sidelink data; or
wherein the report does not belong to a logical channel or does not come from a logical channel.

12. The method of claim 8, further comprising:
transmitting, by the first device, a signaling of the scheduling request to the network when the first device has an available uplink resource for performing a Physical Uplink Shared Channel (PUSCH) transmission.

13. The method of claim 8, further comprising:
transmitting, by the first device, a signaling of the scheduling request to the network based on one scheduling request configuration associated with the report.

14. The method of claim 8, at least one of:
wherein the report is assembled into a Medium Access Control (MAC) Protocol Data Unit (PDU) when the first device has an available sidelink resource for transmitting the report within the duration time; or wherein the report is included in a MAC Control Element (CE) and the MAC PDU comprises the MAC CE.

15. A method for a first device to perform a sidelink communication, the method comprising:
receiving a sidelink control information with a report request from a second device;
triggering or being triggered to transmit a report to the second device in response to the report request, wherein:
a duration time starts or restarts counting when the first device receives or detects:
the triggering or the being triggered; or
the sidelink control information with the report request,
the duration time is configured for canceling or discarding not yet transmitted or not yet assembled report, and
the report is sidelink (SL) channel state information (CSI) report and the report comprises at least one of a Channel Quality Indicator, a Rank Indicator, or a Precoding Matrix Indicator; and
canceling or discarding the report if the first device has not yet transmitted or assembled the report within the duration time.

16. The method of claim 15, further comprising:
acquiring a sidelink resource; and
if the sidelink resource is within the duration time, utilizing, by the first device, the sidelink resource to transmit the report to the second device.

17. The method of claim 16, wherein if the sidelink resource is after the duration time, the first device does not utilize the sidelink resource to transmit the report to the second device.

18. The method of claim 16, wherein the first device acquires the sidelink resource via a resource selection based on a sensing result, or wherein the first device acquires the sidelink resource via receiving a sidelink grant from a network.

19. The method of claim 15, wherein when the first device has no available sidelink resource for transmitting the report, triggering a scheduling request; and
transmitting, by the first device, a signaling of the scheduling request to a network.

20. The method of claim 15, at least one of:
wherein the report is different from a sidelink buffer status report;
wherein the report does not trigger a sidelink buffer status report to a network;
wherein the report is not taken into consideration when triggering or generating a sidelink buffer status report;
wherein the report comprises values at least one of derived or indicated from a physical layer;
wherein the report is derived from a SL CSI-RS measurement;
wherein the report is not or is not regarded as sidelink data; or
wherein the report does not belong to a logical channel or not come from a logical channel.

* * * * *